(12) United States Patent
Sommers

(10) Patent No.: US 12,056,028 B2
(45) Date of Patent: Aug. 6, 2024

(54) METHODS, SYSTEMS, AND COMPUTER READABLE MEDIA FOR USING AN IMPAIRMENT CONFIGURATION MANAGER

(71) Applicant: Keysight Technologies, Inc., Santa Rosa, CA (US)

(72) Inventor: Christian Paul Sommers, Bangor, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/945,850

(22) Filed: Sep. 15, 2022

(65) Prior Publication Data
US 2024/0095156 A1    Mar. 21, 2024

(51) Int. Cl.
*G06F 11/26* (2006.01)
(52) U.S. Cl.
CPC .................. *G06F 11/261* (2013.01)
(58) Field of Classification Search
CPC ..... G06F 11/26; G06F 11/261; G06F 11/3688
See application file for complete search history.

(56) References Cited

U.S. PATENT DOCUMENTS

| | | |
|---|---|---|
| 4,792,753 A | 12/1988 | Iwai |
| 5,247,517 A | 9/1993 | Ross et al. |
| 5,343,463 A | 8/1994 | Van Tetering et al. |
| 5,390,314 A | 2/1995 | Swanson |
| 5,477,531 A | 12/1995 | McKee et al. |
| 5,535,338 A | 7/1996 | Krause et al. |
| 5,568,471 A | 10/1996 | Hershey et al. |
| 5,583,792 A | 12/1996 | Li et al. |
| 5,590,285 A | 12/1996 | Krause et al. |
| 5,600,632 A | 2/1997 | Schulman |
| 5,657,438 A | 8/1997 | Wygodny et al. |
| 5,671,351 A | 9/1997 | Wild et al. |
| 5,751,963 A | 5/1998 | Umetsu |

(Continued)

FOREIGN PATENT DOCUMENTS

| | | |
|---|---|---|
| EP | 0895375 A2 | 2/1999 |
| JP | 4620103 B2 | 1/2011 |

(Continued)

OTHER PUBLICATIONS

"Network Emulator 3," Keysight, pp. 1-7 (Sep. 1, 2022).

(Continued)

*Primary Examiner* — Joseph R Kudirka

(57) ABSTRACT

One example method occurs at an impairment configuration manager of a network test system implemented using at least one processor, the method comprising: receiving impairment definition information for defining one or more impairments associated with a test session involving a test infrastructure connecting at least one test application and a system under test (SUT), wherein the impairment definition information includes information for indicating attributes of the one or more impairments using a common data model or data format; generating, using the impairment definition information, at least one set of instructions for configuring at least one impairment element to implement the one or more impairments during the test session; and providing the at least one set of instructions to the at least one impairment element or another entity.

15 Claims, 6 Drawing Sheets

600 →

602 — RECEIVE IMPAIRMENT DEFINITION INFORMATION FOR DEFINING ONE OR MORE IMPAIRMENTS ASSOCIATED WITH A TEST SESSION INVOLVING A TEST INFRASTRUCTURE CONNECTING AT LEAST ONE TEST APPLICATION AND A SYSTEM UNDER TEST (SUT), WHEREIN THE IMPAIRMENT DEFINITION INFORMATION INCLUDES INFORMATION FOR INDICATING ATTRIBUTES OF THE ONE OR MORE IMPAIRMENTS USING A COMMON DATA MODEL OR DATA FORMAT

604 — GENERATE, USING THE IMPAIRMENT DEFINITION INFORMATION, AT LEAST ONE SET OF INSTRUCTIONS FOR CONFIGURING AT LEAST ONE IMPAIRMENT ELEMENT TO IMPLEMENT THE ONE OR MORE IMPAIRMENTS DURING THE TEST SESSION

606 — PROVIDE THE AT LEAST ONE SET OF INSTRUCTIONS TO THE AT LEAST ONE IMPAIRMENT ELEMENT OR ANOTHER ENTITY

(56) References Cited

U.S. PATENT DOCUMENTS

| | | |
|---|---|---|
| 5,761,486 A | 6/1998 | Watanabe et al. |
| 5,787,147 A | 7/1998 | Gundersen |
| 5,787,253 A | 7/1998 | McCreery et al. |
| 5,822,520 A | 10/1998 | Parker |
| 5,838,919 A | 11/1998 | Schwaller et al. |
| 5,850,386 A | 12/1998 | Anderson et al. |
| 5,850,388 A | 12/1998 | Anderson et al. |
| 5,854,889 A | 12/1998 | Liese et al. |
| 5,878,032 A | 3/1999 | Mirek et al. |
| 5,905,713 A | 5/1999 | Anderson et al. |
| 5,974,237 A | 10/1999 | Shurmer et al. |
| 5,974,457 A | 10/1999 | Waclawsky et al. |
| 5,978,940 A | 11/1999 | Newman et al. |
| 5,982,852 A | 11/1999 | Schwartz |
| 6,031,528 A | 2/2000 | Langfahl, Jr. |
| 6,044,091 A | 3/2000 | Kim |
| 6,108,800 A | 8/2000 | Asawa |
| 6,122,670 A | 9/2000 | Bennett et al. |
| 6,148,277 A | 11/2000 | Asava et al. |
| 6,172,989 B1 | 1/2001 | Yanagihara et al. |
| 6,173,333 B1 | 1/2001 | Jolitz et al. |
| 6,189,031 B1 | 2/2001 | Badger et al. |
| 6,233,256 B1 | 5/2001 | Dieterich et al. |
| 6,246,684 B1 | 6/2001 | Chapman et al. |
| 6,279,124 B1 | 8/2001 | Brouwer et al. |
| 6,295,557 B1 | 9/2001 | Foss et al. |
| 6,317,788 B1 | 11/2001 | Richardson |
| 6,321,264 B1 | 11/2001 | Fletcher et al. |
| 6,345,302 B1 | 2/2002 | Bennett et al. |
| 6,363,056 B1 | 3/2002 | Beigi et al. |
| 6,430,617 B1 | 8/2002 | Britt et al. |
| 6,446,121 B1 | 9/2002 | Shah et al. |
| 6,507,923 B1 | 1/2003 | Wall et al. |
| 6,526,259 B1 | 2/2003 | Ho |
| 6,545,979 B1 | 4/2003 | Poulin |
| 6,601,020 B1 | 7/2003 | Myers |
| 6,621,805 B1 | 9/2003 | Kondylis et al. |
| 6,625,689 B2 | 9/2003 | Narad et al. |
| 6,678,246 B1 | 1/2004 | Smyth |
| 6,717,917 B1 | 4/2004 | Weissberger et al. |
| 6,826,259 B2 | 11/2004 | Hoffman |
| 6,845,352 B1 | 1/2005 | Wang |
| 6,917,595 B2 | 7/2005 | Chang et al. |
| 7,099,438 B2 | 8/2006 | Rancu et al. |
| 7,123,616 B2 | 10/2006 | Weissberger et al. |
| 7,143,159 B1 | 11/2006 | Grace et al. |
| 7,327,686 B2 | 2/2008 | Standridge |
| 7,342,897 B1 | 3/2008 | Nader et al. |
| 7,366,174 B2 | 4/2008 | MacFaden et al. |
| 7,486,728 B2 | 2/2009 | Park |
| 7,507,948 B2 | 3/2009 | Park et al. |
| 7,525,473 B2 | 4/2009 | Chu et al. |
| 7,593,345 B2 | 9/2009 | Dubéet al. |
| 7,633,939 B2 | 12/2009 | Curran-Gray et al. |
| 7,751,449 B2 | 7/2010 | Winters |
| 7,840,664 B2 | 11/2010 | Dugatkin et al. |
| 7,873,056 B2 | 1/2011 | Higuchi et al. |
| 7,979,225 B2 | 7/2011 | Muller et al. |
| 8,718,070 B2 | 5/2014 | Koponen et al. |
| 8,914,432 B2 | 12/2014 | Hannel et al. |
| 8,942,109 B2 | 1/2015 | Dorenbosch et al. |
| 8,949,830 B2 | 2/2015 | Kannan et al. |
| 8,959,185 B2 | 2/2015 | Nakil et al. |
| 9,042,245 B2 | 5/2015 | Tzannes et al. |
| 9,063,815 B2 | 6/2015 | Kundu et al. |
| 9,065,770 B2 | 6/2015 | Chew et al. |
| 9,231,849 B2 | 1/2016 | Hyoudou et al. |
| 9,614,689 B2 | 4/2017 | Cook et al. |
| 9,628,339 B1 | 4/2017 | Thai et al. |
| 9,747,084 B2 | 8/2017 | Hall |
| 9,891,898 B1 | 2/2018 | Tonsing |
| 9,912,592 B2 | 3/2018 | Sampath et al. |
| 9,971,620 B2 | 5/2018 | Karnes |
| 10,002,247 B2 | 6/2018 | Suarez et al. |
| 10,063,473 B2 | 8/2018 | Wenig |
| 10,303,796 B2 | 5/2019 | Gangadharappa et al. |
| 10,324,436 B2 | 6/2019 | Oliverio et al. |
| 10,394,991 B2 | 8/2019 | Phoon et al. |
| 10,649,747 B2 | 5/2020 | Voellmy |
| 10,686,671 B1 | 6/2020 | Mozumdar et al. |
| 10,733,088 B1 | 8/2020 | Sommers |
| 10,868,730 B2 | 12/2020 | Mozumdar et al. |
| 10,880,019 B1 | 12/2020 | Mestre Adrover et al. |
| 10,880,197 B2 | 12/2020 | Naskar et al. |
| 10,915,437 B1 | 2/2021 | Arguelles et al. |
| 11,301,362 B1 | 4/2022 | John et al. |
| 11,323,354 B1 | 5/2022 | Sommers |
| 11,388,081 B1 | 7/2022 | Sommers et al. |
| 11,424,020 B2 | 8/2022 | Wisser et al. |
| 11,765,068 B2 | 9/2023 | Sommers |
| 2001/0016867 A1 | 8/2001 | Hu et al. |
| 2002/0056100 A1 | 5/2002 | Shimomura et al. |
| 2002/0105911 A1 | 8/2002 | Pruthi et al. |
| 2002/0138226 A1 | 9/2002 | Doane |
| 2002/0172205 A1 | 11/2002 | Tagore-Brage et al. |
| 2002/0184527 A1 | 12/2002 | Chun et al. |
| 2003/0009544 A1 | 1/2003 | Wach |
| 2003/0043434 A1 | 3/2003 | Brachmann et al. |
| 2003/0061506 A1 | 3/2003 | Cooper et al. |
| 2003/0069952 A1 | 4/2003 | Tams et al. |
| 2003/0139919 A1 | 7/2003 | Sher et al. |
| 2003/0188003 A1 | 10/2003 | Sylvest et al. |
| 2003/0231741 A1 | 12/2003 | Rancu et al. |
| 2004/0111502 A1 | 6/2004 | Oates |
| 2004/0111519 A1 | 6/2004 | Fu et al. |
| 2004/0158602 A1 | 8/2004 | Broberg |
| 2004/0236866 A1 | 11/2004 | Dugatkin et al. |
| 2005/0021715 A1 | 1/2005 | Dugatkin et al. |
| 2006/0088060 A1 | 4/2006 | Fujikami et al. |
| 2006/0109796 A1 | 5/2006 | Koptiw et al. |
| 2006/0256720 A1 | 11/2006 | Curran-Gray et al. |
| 2008/0186968 A1 | 8/2008 | Farinacci et al. |
| 2009/0003207 A1 | 1/2009 | Elliott |
| 2013/0013107 A1 | 1/2013 | Felique |
| 2014/0298335 A1 | 10/2014 | Regev et al. |
| 2015/0365288 A1 | 12/2015 | Van Der et al. |
| 2017/0126588 A1 | 5/2017 | Anand et al. |
| 2018/0137139 A1 | 5/2018 | Bangalore et al. |
| 2019/0372881 A1 | 12/2019 | Hu et al. |
| 2019/0384580 A1 | 12/2019 | Martini et al. |
| 2020/0133688 A1 | 4/2020 | Shinde et al. |
| 2020/0366588 A1 | 11/2020 | Bergeron |
| 2021/0377146 A1 | 12/2021 | Sommers |
| 2021/0389954 A1 | 12/2021 | Sommers |
| 2022/0253324 A1 | 8/2022 | Liu et al. |
| 2023/0198883 A1 | 6/2023 | Sommers |

FOREIGN PATENT DOCUMENTS

| | | |
|---|---|---|
| WO | 02056541 A2 | 7/2002 |
| WO | 2021015802 A1 | 1/2021 |

OTHER PUBLICATIONS

"tc(8)—Linux manual page," https://man7.org/linux/man-pages/man8/tc.8.html, pp. 1-15 (Aug. 27, 2021).

"Network Emulator II—Ethernet," Keysight, pp. 1-9 (Jun. 25, 2021).

Broom, "VoIP Quality Assessment: Taking Account of the Edge-Device," IEEE Transactions on Audio, Speech, and Language Processing, vol. 14, No. 6, pp. 1-7 (Nov. 2006).

Notice of Allowance for U.S. Appl. No. 17/560,187 (Jun. 23, 2023).

Notice of Allowance and Fee(s) Due for U.S. Appl. No. 17/217,920 (Mar. 4, 2022).

Notice of Allowance and Fee(s) Due for U.S. Appl. No. 17/067,627 (Feb. 8, 2022).

Notice of Allowance and Fee(s) Due for U.S. Appl. No. 17/217,920 (Jan. 14, 2022).

"TekExpress USB 3.0 (USB-RMT) Automated Receiver Compliance and Margin Test Solutions," Tektronix, pp. 1-154 (2021).

"QSFP DD Loopback Modules," High Speed IO, Amphenol ICC, pp. 1-2 (2021).

(56) References Cited

OTHER PUBLICATIONS

Sultana et al., "Flightplan Dataplane Disaggregation and Placement for P4 Programs," 18th {USENIX} Symposium on Networked Systems Design and Implementation, pp. 1-22 (2021).
"Agilent E4219A ATM Network Impairment Emulator," Keysight, pp. 1-5 (2021).
"Spirent Network Emulator," Spirent Communications, pp. 1-11 (Apr. 2021).
"Ethernet Network Emulator," MGA2510 Product Brief, Aukua Systems, pp. 1-2 (2021).
"Chimera Network Impairment Emulator," Xena Networks, pp. 1-2 (2021).
Notice of Allowance and Fee(s) Due for U.S. Appl. No. 17/067,627 (Oct. 22, 2021).
Notice of Allowance and Fee(s) Due for U.S. Appl. No. 17/067,627 (Aug. 20, 2021).
"Network Emulator II—Ethernet 10GE, 1GE, and 100MbE Ethernet Impairment Emulation," Keysight Technologies, pp. 1-8 (Oct. 22, 2020).
Commonly-assigned, co-pending U.S. Appl. No. 17/067,627 for "Methods, Systems, and Computer Readable Media for Network Testing Using Switch Emulation," (Unpublished, filed Oct. 9, 2020).
Cao et al., "TurboNet: Faithfully Emulating Networks with Programmable Switches," IEEE, pp. 1-11 (2020).
"INE Network Emulator Appliance," Technical Specifications, pp. 1-2 (2018).
"Datasheet—Albedo Net.Storm," Albedo Telecom, pp. 1-2 (Dec. 23, 2015).
"Albedo Net.Storm," NETSTORM.en, pp. 1-4 (2014).
"The Value of Network Impairment Testing in Power Grids," Calnex SNE, pp. 1-2 (2006).
Zhang et al., "HyperV: A High Performance Hypervisor for Virtualization of the Programmable Data Plane," 2017 26th International Conference on Computer Communication and Networks (ICCCN), pp. 1-9 (2017).
Cziva et al., "High-Performance Virtualized SDN Switches for Experimental Network Testbeds," SI:SC16-INDIS, pp. 1-14 (Nov. 8, 2016).
Khalidi, "SONIC: The networking switch software that powers the Microsoft Global Cloud," Blog(/en-us/blog/) Cloud Strategy, pp. 1-10 (Mar. 8, 2017).
Siron, "What is the Hyper-V Virtual Switch and How Does it Work?" Altaro, pp. 1-22 (Sep. 26, 2019).
Han et al., "Virtualization in Programmable Data Plane: A Survey and Open Challenges," IEEE Open Journal of the Communications Society, pp. 1-7 (2020).
"Networking/SAI," Open Compute, pp. 1-6 (Oct. 2020).
Spirent Communications, "Cloud Computing Testing," pp. 1-10 (Apr. 2010).
Notice of Allowance and Fee(s) Due and for U.S. Appl. No. 13/228,291 (Mar. 23, 2015).
Final Office Action for U.S. Appl. No. 13/228,291 (Nov. 6, 2014).
Non-Final Office Action for U.S. Appl. No. 13/228,291 (Apr. 25, 2014).
Advisory Action for U.S. Appl. No. 13/228,291 (Nov. 12, 2013).
Final Office Action for U.S. Appl. No. 13/228,291 (Sep. 11, 2013).
Non-Final Office Action for U.S. Appl. No. 13/228,291 (Mar. 19, 2013).
Spirent Communications, Spirent Gem Ethernet Network Impairment Emulators, Network Playback Module for CES, TOP, MEF-18, G8261, pp. 1-4 http://www.spirent.com/~/media/Datasheets/Broadband/PAB/GEM_Impairments/GEM_NW_Playback_Module_for_CES_TOP_MEF_18_G8261_Datasheet.pdf, accessed Jan. 17, 2012.
Spirent XGEM 10Gigabit Ethernet Multi-Profile Network and Impairment Emulator V3.1, User Guide, Spirent Communications, XP-002693593, pp. 1-211 (Mar. 2009).
Notice of Allowance and Fee(s) Due and Examiner-Initiated Interview Summary for U.S. Appl. No. 17/321,336 (Jun. 9, 2022).
Notice of Allowance and Fee(s) Due for U.S. Appl. No. 17/220,617 (Apr. 13, 2022).
Notice of Allowance and Fee(s) Due for U.S. Appl. No. 17/220,617 (Feb. 10, 2022).
Neves et al., "Dynamic Property Enforcement in Programmable Data Planes," IEEE/ACM Transactions on Networking, vol. 29, No. 4, pp. 1-13 (Aug. 2021).
Sommers, "P4 Data Plane Profile Reconciliation," ip.com, pp. 1-5 (2020).
Sommers, "Multiple Data Plane Profiles Digest and Catalog Definition and Selection," ip.com, pp. 1-5 (2020).
Sommers, "P4 Profile Generation Based on Prospective Device Configuration," ip.com, pp. 1-9 (2020).
Sommers, "Composable/Scalable Data Plane Based on Initial Complier Input Parameters," ip.com, pp. 1-8 (2020).
Johansson et al., "Dynamic Configuration of Packet Deduplication Engine in Tofino," ip.com, pp. 1-6 (2020).
Song et al., "Dynamic Network Probes: A Stepping Stone to Omni Network Visibility," arXiv: 1612.02862v1, pp. 1-7 (Dec. 8, 2016).
Fiandrino, et al., "openLEON: An End-to-End Emulation Platform from the Edge Data Center to the Mobile User", Sep. 7, 2019. Computer Communications 148, Elsevier B.V. (Year: 2019).
Benet, et al., "OpenStackEmu—A Cloud TestBed Combining Network Emulation with OpenStack and SDN", 2017, 14th IEEE Annual Consumer Communications & Networking Conference (CCNC), IEEE. (Year: 2017).
Cao, et al., "TurboNet: Faithfully Emulating Networks with Programmable Switches", IEEE. (Year: 2020).
Non-Final Office Action for U.S. Appl. No. 17/171,716 (Mar. 14, 2024).
Non-Final Office Action for U.S. Appl. No. 17/498,723 (Mar. 13, 2024).

400

```
"IMPAIRMENT": {
  ...
  "drop_frames": [
    {
      "interval": 1,
      "link": "Link S.1/1",
      "mode": "percentage_time",
      "name": "10 percent drop",
      "percentage": 10.0
    },
    {
      "interval": 1,
      "link": "Link P.2.1/1",
      "mode": "min_time",
      "name": "Minimum possible drop",
      "percentage": 5.0
    },
    ...
  ]
}
```

FIG. 4

METHODS, SYSTEMS, AND COMPUTER READABLE MEDIA FOR USING AN IMPAIRMENT CONFIGURATION MANAGER

TECHNICAL FIELD

The subject matter described herein relates to network testing. More specifically, the subject matter relates to methods, systems, and computer readable media for using an impairment configuration manager.

BACKGROUND

Various test environments may be configured for emulating or approximating realistic network scenarios and/or processing scenarios. For example, when testing equipment for use in large-scale networks or data centers, test environments may need to emulate a switching fabric or various network nodes. To properly test networks or equipment, developers and system engineers may use physical or virtual impairment devices to generate or cause one or more impairments, e.g., network latency, jitter, bit errors, dropped packets, etc. For example, impairment testing can be useful in recreating real-world scenarios in test environments, testing network and/or system resiliency, observing system impacts, comparing algorithms, etc.

While impairment devices are useful for testing, various issues can arise when attempting to configure impairment devices, especially when different types or models of impairment devices have disparate features and utilize different configuration protocols and/or procedures.

SUMMARY

Methods, systems, and computer readable media for using an impairment configuration manager are disclosed. One example method occurs at an impairment configuration manager of a network test system implemented using at least one processor, the method comprising: receiving impairment definition information for defining one or more impairments associated with a test session involving a test infrastructure connecting at least one test application and a system under test (SUT), wherein the impairment definition information includes information for indicating attributes of the one or more impairments using a common data model or data format; generating, using the impairment definition information, at least one set of instructions for configuring at least one impairment element to implement the one or more impairments during the test session; and providing the at least one set of instructions to the at least one impairment element or another entity.

According to one example system, the system includes an impairment configuration manager of a network test system implemented using at least one processor, the impairment configuration manager configured for: receiving impairment definition information for defining one or more impairments associated with a test session involving a test infrastructure connecting at least one test application and a SUT, wherein the impairment definition information includes information for indicating attributes of the one or more impairments using a common data model or data format; generating, using the impairment definition information, at least one set of instructions for configuring at least one impairment element to implement the one or more impairments during the test session; and providing the at least one set of instructions to the at least one impairment element or another entity.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which:

FIG. 4 is a diagram illustrating an example impairment configuration data using a common data model or data format;

DETAILED DESCRIPTION

Figure 1:
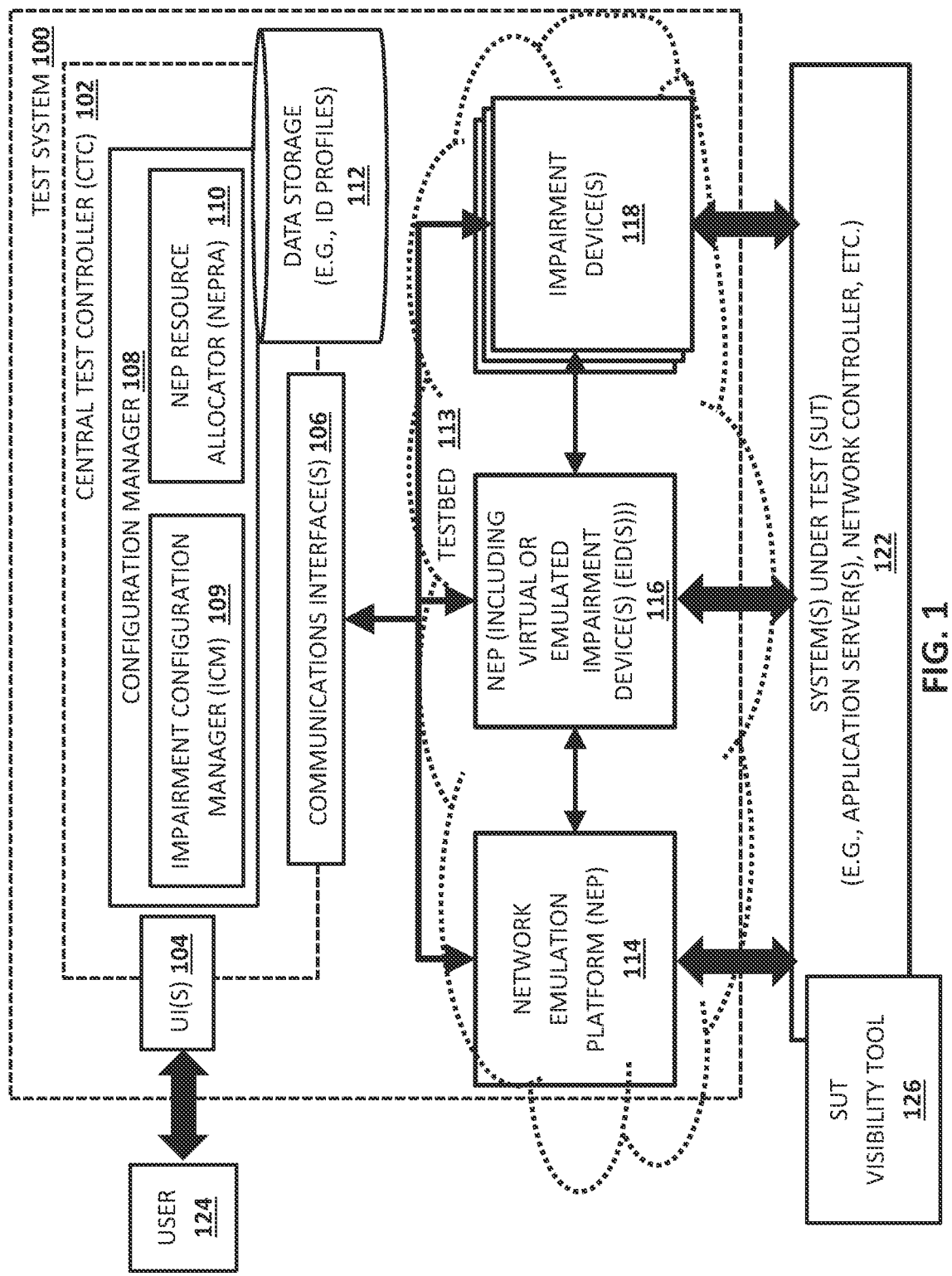
FIG. 1 is a diagram illustrating an example test system for network testing.

The subject matter described herein includes methods, systems, and computer readable media for using an impairment configuration manager. Various test environments may be configured for emulating or approximating realistic network scenarios and/or processing scenarios. For example, when testing equipment for use in large-scale networks or data centers, test environments may need to emulate a switching fabric that include multiple switches (e.g., network switches, network routers, or other packet forwarding devices). Switching fabric emulation can be useful for testing how a new network product or service performs at scale in a particular environment (e.g., a data center environment) and/or for testing how a new network product or service will impact the performance of a particular switching fabric environment. However, to properly test networks or equipment, developers and system engineers may use impairment simulators or other impairment devices (IDs) (e.g., virtual and/or physical impairment devices or elements) to recreate scenarios in test environments, in order to test resiliency, observe system impacts, compare algorithms, etc.

Depending on the test environment, multiple techniques may be needed setting up and configuring various types of impairment scenarios and related devices. For example, Linux traffic control (TC) may be used to implement impairments in some Linux based devices and may require Linux shell commands and related configuration files. In another example, a hardware-based impairment emulator device may utilize a proprietary application programming interface (API) and/or a proprietary configuration file that is unique or different from the configuration requirements of other IDs, including other hardware-based IDs and software-based impairments devices, e.g., emulated or virtual IDs (VIDs). Hence, the lack of a cohesive data model between various hardware-based IDs and software-based IDs (e.g., virtual or emulated or virtual IDs (VIDs)) that may be used in test environments can add complexity and costs, and further, can reduce testing speed, test setup flexibility, and/or efficiency.

In accordance with some aspects of the subject matter described herein, an emulated switch is distinctly different from an entity referred to commonly in the industry as a virtual switch. More particularly, a virtual switch (vSwitch) is a software application that runs on top of a CPU, which allows communication between virtual machines, where the virtual machines are administered by a virtual machine hypervisor. A vSwitch does not subdivide and allocate resources of an underlying physical switch (e.g., a system on a chip (SoC), a fixed-function or programmable application-specific integrated circuit (ASIC), a switch processor, etc.) into multiple emulated switches, but instead creates a software representation of a completely virtual switch and there is no mapping to underlying physical switching ASIC or chip hardware resources.

In accordance with some aspects of the subject matter described herein, a test system (e.g., one or more computing platforms, devices, or nodes) may be configured to emulate a switching fabric environment (e.g., a data center environment), such as virtual networking resources and/or other switching fabric related resources. In accordance with some aspects of the subject matter described herein, a switching fabric emulator may be implemented using one or more network emulation platforms (NEPs) (e.g., chassis or nodes with one or more physical switching application-specific integrated circuit (ASIC) resources usable for emulating a number of switches connected via various topologies). It will be appreciated that some embodiments include one or more emulated switches, where an emulated switch is a logically allocated portion of a physical switch processor (e.g., a switching ASIC or a programmable switching chip) of a NEP that appears as an independent logical switch device to the environment (e.g., a DUT, SUT, or controller) by using a NEP resource allocator (NEPRA) and/or a switching ASIC resource allocator (SARA). In some embodiments, the NEPRA and/or SARA may be configured to facilitate collection and reporting of emulated logical switch performance metric information (e.g., emulated logical switch packet queue depth, emulated logical switch latency, etc.) during a test run or session by a visibility module.

In accordance with some aspects of the subject matter described herein, a test system may be configured to utilize a user interface for facilitating impairment configuration and/or related orchestration. For example, a test system with an impairment configuration manager may include a graphical user interface (GUI) and/or application programming interface (API) to allow a test operator or user to provide and/or view impairment profiles (also referred to herein as ID profiles) indicating capabilities, current status or availability, and/or other information about particular impairment elements potentially usable in a test environment. In this example, the test operator or user may select impairment elements (e.g., using the ID profiles) for implementing a requested impairment. In another example, e.g., via a GUI or API, the test operator or user may indicate how or whether the test system can automatically configure or implement impairments defined by received impairment definition information, e.g., by allowing the test operator to indicate or provide selection techniques and/or criteria for selecting impairment elements (e.g., based on ID profiles in an ID profiles store or library) to implement one or more requested impairments.

In accordance with some aspects of the subject matter described herein, a test system may include functionality for generating and/or implementing various impairment configurations in test environments, including configuring emulated impairment elements (e.g., an emulated ID or an impairment-creating processing pipeline implemented using a NEP) and/or non-emulated elements (e.g., a real or physical network ID). For example, a test system may include an impairment configuration manager or related functionality for using an impairment definition file or related data f (e.g., information for indicating attributes of one or more impairments using a common or generic impairment data model or data format) to generate configuration and/or orchestration commands or other information for configuring one or more impairment element(s) for implementing impairments defined or described in the impairment definition file or related data. For example, when configuring a test session involving a test system testing a SUT, a test operator may send an impairment definition file (e.g., an extensible markup language (XML) or a JavaScript object notation (JSON) file) or related data to the test system or elements thereof. In this example, an impairment configuration manager or another entity may use the impairment definition file to compile or generate one or more sets of instructions (e.g., an executable file or script, commands, etc.) for configuring one or more impairment element(s) (e.g., virtual and/or physical IDs) for implementing impairments defined by the impairment definition file or related data.

In accordance with some aspects of the subject matter described herein, virtual IDs that can be configured to implement or provide impairments based on a common data model or data format may include emulated switches, softswitches, or other software-based IDs. For example, a test system or a related impairment configuration manager may send instructions (e.g., a file, a script, commands, or an OS image) for configuring a packet or frame processing pipeline or another aspect of a software-based or virtual device for implementing one or more impairments using a programming language, such as P4, NPL, eBPF, Linux TC, etc.

In accordance with some aspects of the subject matter described herein, physical IDs that can be configured to implement or provide impairments based on a common data model or data format may include various hardware-based IDs, e.g., different models or versions of distinct impairment platforms or programmable switches. For example, a test system or a related impairment configuration manager may send instructions (e.g., a file, a script, or commands) in a supported format for configuring a particular brand or model of a network emulator device. In another example, a test system or a related impairment configuration manager may send instructions (e.g., a file, a script, commands, or an OS image) for configuring a packet or frame processing pipeline or another aspect of a distinct whitebox or programming device for implementing one or more impairments using a programming language, such as P4, NPL, eBPF, etc.

In accordance with some aspects of the subject matter described herein, a test system may be configured to analyze and/or compare the test results after executing one or more test sessions using various impairment configurations, e.g., environments with different IDs or elements. For example, a test system with an impairment configuration manager may run a series of performance tests with test traffic being impaired using emulated IDs (e.g., implemented using a NEP) and then may run the same series of performance test with test traffic being impaired using non-emulated IDs (e.g., physical IDs). In this example, the test system or related test analyzer may compare the test results associated with the different impairment configurations and generate reports, graphics, etc. to show similarities, differences, or other notable information associated with these impairment configurations.

By using an impairment configuration manager to generate configuration information (e.g., configuration, command, and/or control instructions) using impairment definition information utilizing a generic or common data model or data format, a test system can configure different types of impairment elements including emulated and/or non-emulated impairment elements. Further, such a test system can analyze and/or compare results of test environments having different types of impairment elements. Moreover, since impairment elements, including fixed-functions IDs made by different manufacturers, can have varying features or capabilities, a generic or common data model or data format can allow a user to define impairments without requiring knowledge of all features or limitations of every possible impairment element usable in testing and/or without knowledge of configuration protocols or data formats for those possible impairment elements. Hence, a test system with an impairment configuration manager in accordance with various aspects described in the present disclosure may effectively test a SUT using a variety of impairment configurations with little to no in-depth technical input from a test operator, e.g., by generating appropriate configuration and/or orchestration information for particular impairment elements based on impairment definition information using a common data model or data format.

It will be appreciated that some aspects of the subject matter described herein may be utilized in various test environments including embodiments that involve emulated impairment elements (e.g., an emulated switching fabric comprising impaired emulated elements or pipelines), as well as embodiments that utilize real/physical impairment elements (e.g., hardware-based network IDs, distinct whitebox or programmable switches that can be programmed using one or more languages (e.g., P4) to implement one or more impairments). It will be appreciated that other embodiments not shown herein may include test scenarios that involve a combination of both virtual and real or physical impairment elements in various test architectures.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an example test system 100 for network testing. Test system 100 may represent any suitable entity or entities (e.g., one or more computing platforms, nodes, or devices) associated with testing SUT 122 (e.g., one or more application servers, a network controller, or a network management system). For example, test system 100 may include a central test controller (CTC) 102 for allowing a user 124 (e.g., a human operator or another entity) to configure or select a testing scenario (e.g., using predefined and/or user-defined templates), for generating and sending test traffic to SUT 122, for receiving response traffic from SUT 122, for configuring impairments based on a common data model (e.g., via an impairment configuration manager (ICM) 109), and/or for analyzing one or more test results, e.g., routing issues and/or performance aspects associated with SUT 122.

In some embodiments, test system 100 may include test configuration software, one or more network equipment test devices or platforms, network emulation platforms (NEPs), visibility tools or modules (e.g., physical or virtual network taps), and/or test related software executing on one or more processor(s).

In some embodiments, test system 100 may include one or more modules for performing various test related functions. For example, test system 100 may include a traffic engine or traffic generator for generating test traffic and/or may include various testing related applications or devices (e.g., a test analyzer or test configuration manager) for testing SUT 122. In this example, test system 100 may also include a central test controller (CTC) 102 for triggering and/or managing one or more test sessions associated with one or more of NEPs 114 and 116 or a related emulated environment.

In some embodiments, test system 100 or aspects thereof may be controlled or defined using one or more user-definable data models. For example, test system 100 may allow user 124 to configure or modify a resource allocator model, a switching model, a data center emulation or switching topology model, a traffic generator model, a network visibility model, an impairment model, etc. In this example, high-level or user-definable data models may be converted into lower-level data models or into computer readable instructions for implementing an emulated switching fabric environment using the user-definable data models and resources in one or more of NEPs 114 and 116.

SUT 122 may be any suitable entity or entities (e.g., devices, systems, or platforms) for receiving, processing, forwarding, and/or sending one or more messages (e.g., packets). In some embodiments, SUT 122 may include one or more logical or physical partitions. For example, SUT 122 may include a network node, a network switch, a network router, a network interface card, a packet forwarding device, or one or more virtual network functions (VNF). In this example, SUT 122 or a VNF thereof may be software in a virtual container (VC) or machine (VM) executing on shared resources (e.g., compute, storage, and network resources in a cloud computing environment). In some embodiments, nodes or a VNF of SUT 122 may include processing logic (e.g., rules associated with packet forwarding/processing) that is independent or separate from another portion of SUT 122 or another VNF.

SUT visibility tool 126 may be any suitable entity or entities (e.g., software executing on a processor, an ASIC, an FPGA, or a combination of software, an ASIC, or an FPGA) for monitoring, obtaining, and/or providing SUT performance or related visibility information (e.g., using virtual or physical probes or network taps). For example, SUT visibility tool 126 may include an application programming interface (API) based server or interface that provides collected SUT performance metrics or other related information to test system 100, CTC 102, packet analyzers, visibility modules, or other entities. In this example, SUT visibility tool 126 may obtain various SUT performance related data from one or more visibility related devices, applications, or nodes within or around SUT 122. Continuing with this example, SUT visibility tool 126 may generate performance reports or test analysis reports associated with SUT 122 and may send the reports to test system 100 or entities therein for analysis or other purposes. In another example, SUT visibility tool 126 may be a system with one or more processors (e.g., central processor units (CPUs)) for capturing packets and/or analyzing traffic or related performance, e.g., offline (e.g., after testing session) or online (e.g., during testing session).

Test system 100 may include CTC 102 for configuring a testbed 113 (e.g., a network, an infrastructure, or an environment of physical and/or virtual devices) for testing SUT 122. In some embodiments, testbed 113 may include multiple network nodes (e.g., switches, forwarding devices, etc.), an emulated switching fabric implemented by one or more of network emulation platforms (NEPs) 114 and 116, and/or one or more distinct ID(s) 118 (e.g., physical IDs or VIDs separate from NEPs 114 and 116). CTC 102 may include any suitable entity or entities (e.g., software executing on a processor, a field-programmable gateway array (FPGA), and/or an ASIC, or a combination of software, an FPGA, and/or an ASIC) for performing one or more aspects associated with configuring a test environment or a related testing scenario. In some embodiments, CTC 102 may be implemented using one or more processors and/or memory and may be a single device or node or may be distributed across multiple devices or nodes, e.g., cloud-based. For example, CTC 102 may act as a centralized, cloud-based entity for receiving user input related to setting up a testing scenario involving an emulated switching fabric environment via one or more UI(s) 104 and may use the user input for configuring NEPs 114 and 116 or other test system entities for the testing scenario. In another example, CTC 102 may send sets of configuration instructions to various modules or entities, e.g., one or more NEPs 114 and 116 and/or ID(s) 118, for setting up or configuring testbed 113 or a portion thereof, e.g., emulated IDs provided by NEP 116 and/or ID(s) 118.

In some embodiments, CTC 102 may include a configuration manager (CM) 108. CM 108 may be any suitable entity or entities (e.g., software executing on a processor, an FPGA, and/or an ASIC, or a combination of software, an FPGA, and/or an ASIC) for performing one or more aspects associated with interfacing with user 124 and/or providing access to various test related services. In some embodiments, CM 108 may include an application programming interface (API) server or gateway and may be usable for providing one or more of UI(s) 104. For example, UI(s) 104 can be usable for provisioning test system 100, controlling test execution, and accessing or viewing test result information including emulated switching fabric environment performance information. In this example, user 124 may communicate with an API server or other test system entity via an external API that is implemented using a remote procedure call (RPC) protocol.

In some embodiments, CM 108 (or a related API server or gateway) may provide access to several test related services (e.g., traffic generation, visibility and switching fabric emulation, chassis resource, test session generation) with which the user can interact, provision, or control. For example, via one or more APIs or UI(s) 104 associated with CM 108, user 124 can provide test traffic generation requirements for a test session; provide or request test result performance metrics; provide data center or switching fabric emulation requirements or configurations; provide which of NEPs 114 and 116 or related resources are available for use in a test session; and/or provide test session definitions and associated configuration parameters.

In some embodiments, CTC 102, CM 108, and/or related entities may include or utilize one or more UI(s) 104 for receiving settings and/or configuration information for setting up a test scenario or a related test session. For example, UI(s) 104 may include any interface usable by one or more types of user 124 (e.g., a human or another entity like an application, a machine, or a device) to interact with test system 100 or related entities. In some embodiments, one or more of UI(s) 104 may support automation e.g., via one or more programming languages (e.g., python), a REST API, an RPC API (e.g., a gRPC API), a command line interface (CLI), a machine-to-machine (M2M) automation interface, and/or a web based GUI.

In some embodiments, UI(s) 104 may include or utilize a GUI or other user interface for selecting and/or configuring emulated switching fabric environments and/or other related settings (e.g., test reporting and/or network visibility settings). For example, CTC 102 and/or CM 108 may provide a web based GUI for obtaining a test operator or another entity's intent for setting up or configuring testing scenarios and/or related emulated switching fabric environments. In this example, the web based GUI may be usable for visually defining a data center switching topology comprising one or more emulated switches and/or to indicate particular physical resources to allocate to each emulated switch. In another example, the web based GUI may be usable for gathering test session settings and/or for providing cabling instructions for interconnecting NEPs 114 and 116 or other entities associated with a test session or test system 100.

In some embodiments, CM 108 may communicate or interact with ICM 109. ICM 109 may be any suitable entity or entities (e.g., software executing on a processor, an FPGA, and/or an ASIC, or a combination of software, an FPGA, and/or an ASIC) for performing one or more aspects associated with controlling, generating, or effecting one or more impairments of a testing environment during a test session or test scenario. In some embodiments, ICM 109 may receive test session related data (e.g., test session settings, user-specified impairment definition information, user preferences, etc.) from CTC 102 and/or CM 108.

In some embodiments, ICM 109 may include or utilize software (e.g., a distributed control and orchestration layer or related API) that provides one or more interfaces for communicating with various test system entities (e.g., impairment controllers in NEPs 114-116) for effecting impairments of an emulated switching fabric environment and visibility tools (e.g., SUT visibility tool 126 and/or NEP visibility modules) for obtaining performance related metrics during a test session. In such embodiments, ICM 109 may use gathered performance metrics and user-defined target state information for various purposes, such as determining whether to (re)adjust impairments or whether a target state has been reached or a stop condition for a test session is met. For example, ICM 109 or related entities may include or interact with a feedback controller element configured for adjusting impairments in a testing environment (e.g., an emulated switch fabric environment and SUT 122) to reach or maintain a user-specified target state (e.g., defined as a collection of conditional rules associated with observable performance metrics).

In some embodiments, ICM 109 or related entities (e.g., impairment controllers in NEPs 114-116) may include functionality for configuring and/or implementing impairments of a testing environment or aspects thereof using a common data model or data format, e.g., an open-source impairment definition file or related language.

In some embodiments, ICM 109 may include an impairment data model provisioning module or related functionality for enabling user 124 to specify or define one or more impairments that may be to be applied to SUT 122 or device therein. In such embodiments, the impairment data model provisioning module or related functionality may use the user input to generate and store an associated impairment data model or related data.

In some embodiments, ICM 109 may include an impairment data model provisioning module or related functionality for enabling user 124 to define and store a plurality of ID profiles. For example, user 124 may provide ID profiles for different types, models, or and/or versions of impairment element(s), e.g., ID(s) 118 and/or VIDs. In this example, each ID profile may represent information about a particular impairment element (e.g., a physical ID or a VI D) and may include or indicate element attributes, element availability, element status, impairment capabilities, supported protocols, preconfigured or default settings, and/or metadata.

In some embodiments, ICM 109 may include an impairment instantiation module or related functionality for receiving user input indicating a selected or provided impairment definition information indicating impairments to implement during a test scenario or test session and/or a selected ID profile representing an ID to perform requested impairments. In some embodiments, user input may include declarative or intent-driven input that defines or specifies one or more impairments (e.g., impairments may be defined in a common data model or data format or impairments may described via natural language or another format).

In some embodiments, an impairment instantiation module or related functionality may compile, translate, or utilize user input (e.g., a user-selected ID profile and/or a user-selected impairment data model) to generate appropriate configuration instructions or information (e.g., an executable image of a user-provided impairment definition information corresponding to a user-selected ID profile or a set of provisionable configuration commands (e.g., API commands, configuration file data, etc.) corresponding to the user-selected ID profile) and may communicate the configuration instructions or information to a target ID (e.g., ID(s) 118, an emulated ID provided by NEP 116, a P4-capable smartswitch device, etc.) corresponding to the user input (e.g., a user-selected ID profile). In some embodiments, impairment related configuration instructions or information (e.g., an executable image, a configuration script, configuration commands, etc.) may be deployed and executed on a target ID during a test of SUT 122 or element(s) therein.

In some embodiments, ICM 109 may include an impairment orchestration module or related functionality for coordinating and facilitating configuration of one or more target IDs (e.g., VIDs and/or ID(s) 118) for use in testing SUT 122 or element(s) therein. In some embodiments, facilitating configuration of one or more target IDs may include creating or causing to be created one or more virtual target IDs, e.g., deploying a VID to a Kubernetes-based Network Emulation (KNE) network, an Azure datacenter network, a lab mini-datacenter, a Kubernetes cluster, etc.

In some embodiments, an impairment orchestration module or related functionality may receive and utilize user-provided selection criteria and/or selection techniques for selecting appropriate target ID(s) for implementing impairments indicated by impairment definition information provided by user 124. For example, if configured to automatically select appropriate ID(s) for implementing impairments defined by received impairment definition information, ICM 109 may analyze ID profiles and select appropriate target ID(s) using a best fit selection technique (e.g., a technique that selects target ID(s) for implementing as closely as possible requested impairments), a least cost selection technique (e.g., a technique that uses one or more cost metrics to select target ID(s) for implementing requested impairments), a multiple factor selection technique (e.g., a technique that weights different factors and using a combined score of the weighted factors to select target ID(s) for implementing requested impairments), or a user-defined selection technique (e.g., a technique that selects at most two different target ID(s) or that only allows non-virtual target ID(s) for implementing requested impairments).

In some embodiments, target IDs (e.g., configurable test system 100 or related entities) may include physical IDs, e.g., a hardware-based network emulator device, a software-based network emulator, a hardware-based ID, a software-based ID, a smartswitch device, a programmable switch ASIC-based ID, a hardware-based data center switching fabric emulator.

In some embodiments, target IDs (e.g., configurable test system 100 or related entities) may also include VIDs, e.g., a VM, a container or VC, a Kubernetes cluster including various elements such as controllers, nodes, etc., bare-metal applications and operating systems, etc.

In some embodiments, impairment related configuration instructions or information may include information for configuring a hardware-based data center fabric emulator (e.g., NEP 116) to emulate network switches deployed in a predetermined switching topology, where the emulated network switch may perform one or more impairments.

In some embodiments, impairments that can be performed by an ID may vary based on user input, test sessions, and/or ID capabilities. For example, a target ID may be configured to apply or introduce impairments that include latency, jitter, dropped packets, packet corruption, bit errors, switch or fabric congestion, link failure, etc.

In some embodiments, ICM 109 or related entities (e.g., impairment controllers in NEPs 114-116) may include or interact with one or more visibility modules (e.g., SUT visibility tool 126 and/or NEP visibility modules) for obtaining and processing performance metrics or related information (e.g., external or internal event data). In such embodiments, the obtained performance metrics or related information may be used in comparing effects of impairments on SUT performance and/or differences of various impairment configurations, e.g., environments with different IDs or elements.

In some embodiments, CTC 102, CM 108, and/or related entities may include or utilize software (e.g., a distributed control and orchestration layer or a related API) that provides one or more interfaces for communicating with various test system entities (e.g., emulated and physical switches) for providing monitoring rules and/or related forwarding and/or routing rules of an emulated switching fabric environment.

In some embodiments, CTC 102, CM 108, and/or related entities may configure one or more of NEPs 114 and 116 to act as a switching fabric emulator. In such embodiments, the switching fabric emulator may be configured to provide emulated switches, e.g., by allocating a subset of resources from underlying switch processors (e.g., fixed-function or programmable switching chips, switching ASICs, etc.) to implement each emulated switch.

In some embodiments, CTC 102, CM 108, and/or related entities may configure testbed 113 or related elements. Testbed 113 may represent a infrastructure, a network, a switching fabric, or a group of devices used for communicating with SUT 122 during testing. For example, testbed 113 may include an emulated environment (e.g., an emulated switching fabric) comprising emulated IDs provided by one or more of NEPs 114 and 116. In another example, testbed 113 may include a non-emulated environment (e.g., a physical testbed) comprising physical or non-emulated IDs, such as ID(s) 118. In another example, testbed 113 may include a partially emulated environment (e.g., emulated switching elements in combination with one or more physical switches) comprising emulated IDs provided by one or more of NEPs 114 and 116 and one or more of ID(s) 118.

In some embodiments, CTC 102, CM 108, and/or related entities may include or interact with one or more analysis and/or visibility modules (e.g., SUT visibility tool 126 and/or NEP visibility modules) for obtaining and processing performance metrics or related information (e.g., external or internal event data). In some embodiments, obtained performance metrics or related information may be used in dynamically adjusting an amount of test traffic (e.g., test packets) and/or adjusting impairments.

In some embodiments, CTC 102, CM 108, and/or related entities may communicate or interact with a NEP resource allocator (NEPRA) 110. NEPRA 110 may be any suitable entity or entities (e.g., software executing on a processor, an FPGA, an ASIC, or a combination of software, an FPGA, and/or an ASIC) for performing one or more aspects associated with communicating with and/or controlling NEPs or related resources. For example, NEPRA 110 may include or utilize software (e.g., a distributed control and orchestration layer or related API) that provides an interface for communicating with NEPs 114 and 116 or other test system entities and may be effectively hidden from user 124.

In some embodiments, NEPRA 110 may allocate and manage resources of NEPs 114 and 116 for emulated switches without requiring a custom ASIC or hardware pipeline. In some embodiments, NEPRA 110 can be external or internal to CM 108.

In some embodiments, NEPRA 110 may include a resource allocator function configured for accessing user-specified switching fabrication emulation requirements or specification information and NEP resource information (e.g., user input and/or predefined knowledge) and to effectively translate the user's declared data center switching fabric emulation specification into a mapping of NEP resources and associated physical resource allocations, e.g., ASIC switch resources in one or more of NEPs 114 and 116).

For example, after user 124 specifies a switching fabric environment to be emulated (e.g., based on a library of pre-defined switching fabric environments) and specifies that only NEPs 114 and 116 are available for use in emulating the target data center topology, NEPRA 110 (or a related resource allocator function) may access a NEP resource information database and generate a physical switch resource allocation map that is applied to the switching hardware (e.g., ASICs, SoCs, etc.) contained in NEP 114. In this example, the generated physical switch resource allocation map may effectively enable the switch resources in NEP 114 to emulate the user-specified target data center topology.

Continuing with the above example, if user 124 subsequently selects NEP 116 to be added to the emulated switching fabric environment, NEPRA 110 or a related entity (e.g., a resource allocator function) may generate a new or updated physical switch resource allocation map that is applied to the switching hardware contained in NEP 114, where the updated physical switch resource allocation map may effectively enable the switch resources in NEPs 114 and 116 to emulate the user-specified target data center topology.

In some embodiments, NEPRA 110 may include a logical to physical adaptor usable for converting and/or translating communications to refer to virtual or physical resources depending on the destination. For example, when requesting information about available switching resources via NEPRA 110, external applications, user 124, and/or SUT 122 may "see" a set of emulated switches each with a subset of resources instead of physical switches in one of NEPs 114 and 116. In this example, e.g., for NEP 114, logical to physical adaptor 212 may translate information about logical resources into information physical resources of a switch (e.g., a Tomahawk 3 series switch) and vice versa so that interacting nodes may remain unaware of the underlying switch(es) or related switch resources. Continuing with this example, e.g., for NEP 116, logical to physical adaptor 212 may translate information about logical resources into information physical resources of a different type of switch (e.g., a Tomahawk 4 series switch) and vice versa so that interacting nodes may remain unaware of the underlying switch(es) or related switch resources.

In some embodiments, NEPRA 110 may act as an orchestrator and reside between a device interface and interacting entities, e.g., SUT 122, testing applications in NEPs 114 and 116, or external devices. In such embodiments, NEPRA 110 may act as a communications proxy or agent using a logical interface and an intermediate protocol or API. For example, after a test session is completed, NEPRA 110 may receive a user-specified request for requesting emulated switch performance metrics and, in response, may process or translate the request using a relevant generated physical switch resource map to query or poll the appropriate switch resources (e.g., in NEPs 114 and 116) in order to obtain and/or synthesize the relevant emulated switching fabric performance information. In this example, the emulated switching fabric performance information may be accessible to user 124 via one or more API(s) or UI(s) 104.

In some embodiments, emulated switch performance data associated with various switching levels or stages and types of generated test traffic may be queried or polled (e.g., on-demand, at prescribed intervals, periodically during test execution, etc.) and stored by test system 100 or entities therein. In such embodiments, the emulated switch performance data may be accessible to user 124 via one or more API(s) or UI(s) 104.

In some embodiments, test system 100 or entities thereof (e.g., CTC 102 and/or NEPRA 110) may utilize communications interface(s) 106 for interacting with various entities. Communications interface(s) 106 may include or utilize any suitable entity or entities (e.g., one or more network interface cards (NICs), pluggable jacks, physical processors, transceiver modules, direct-attach cables (DACs) and/or other hardware) for sending or receiving communications. For example, communications interface(s) 106 (e.g., physical or virtual links) may allow CTC 102 or other entities (e.g., CM 108 or NEPRA 110) to send configuration information, settings, instructions, or other data to one or more of NEPs 114 and 116. In another example, communications interface(s) 106 (e.g., via physical or virtual links) may allow CTC 102 or other entities to receive test results or feedback from SUT visibility tool 126, NEP visibility tools, or other entities.

Each of NEPs 114 and 116 may include hardware and software usable for network emulation and/or switching fabric emulation. For example, each of NEPs 114 and 116 may be a distinct or separate chassis comprising an implementation of a particular switch processor (e.g., a switching ASIC, a system on a chip (SoC), custom hardware, an FPGA, a software switch, etc.), and dedicated data and control plane test traffic generation hardware resources (e.g., an FPGA, a CPU, a programmable data plane device like a P4 device, etc.). In some embodiments, NEPs 114 and 116 may be interconnected via various communication ports or links, e.g., 10 gigabit (10G) links, 25 gigabit (25G) links, 40 gigabit (40G) links, 100 gigabit (100G) links, etc.

In some embodiments, test system 100 or entities thereof (e.g., CTC 102, testing applications, and/or NEPRA 110) may include functionality for accessing data storage 112. Data storage 112 may be any suitable entity or entities (e.g., a storage device, a non-transitory computer readable medium, or a storage system) for maintaining or storing information related to data center emulation, network testing, or related test analysis. For example, data storage 112 may include data center emulation data (e.g., NEP resources to emulated switches, physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 112 may also include test traffic models, test sessions, test session data, topology information for emulated switching fabric environments and/or for SUT 122, and/or other information usable for generating performance metrics (e.g., statistics) associated with one or more aspects of SUT 122. In some embodiments, data storage 112 may be located at test system 100, another node, or distributed across multiple platforms or devices.

It will be appreciated that FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of CTC 102, CM 108, and NEPRA 110. Further, while ICM 109 and related functionality has been described above with regard to emulated switching fabrics, NEPs 114 and 116, and/or other entities, it will be appreciated that impairments or impairment configurations defined in a generic or common data model or data format (e.g., a generic model based JSON or XML file) can be utilized in various test environments, including environments or testbeds without NEPs 114 and 116 or an emulated switching fabric. For example, a test operator may define an impairment configuration in a generic model based file for a test environment comprising a simple point-to-point Ethernet link between two network interface cards. In this example, ICM 109 or another entity with similar functionality may use the generic model based file or data therein to generate instructions or commands for configuring or setting up of various types of IDs in the test environment, e.g., a proprietary network emulator appliance; eBPF code and/or Linux TC commands executing on one or more host computer(s); a P4 programmable switch, etc.

Figure 2:
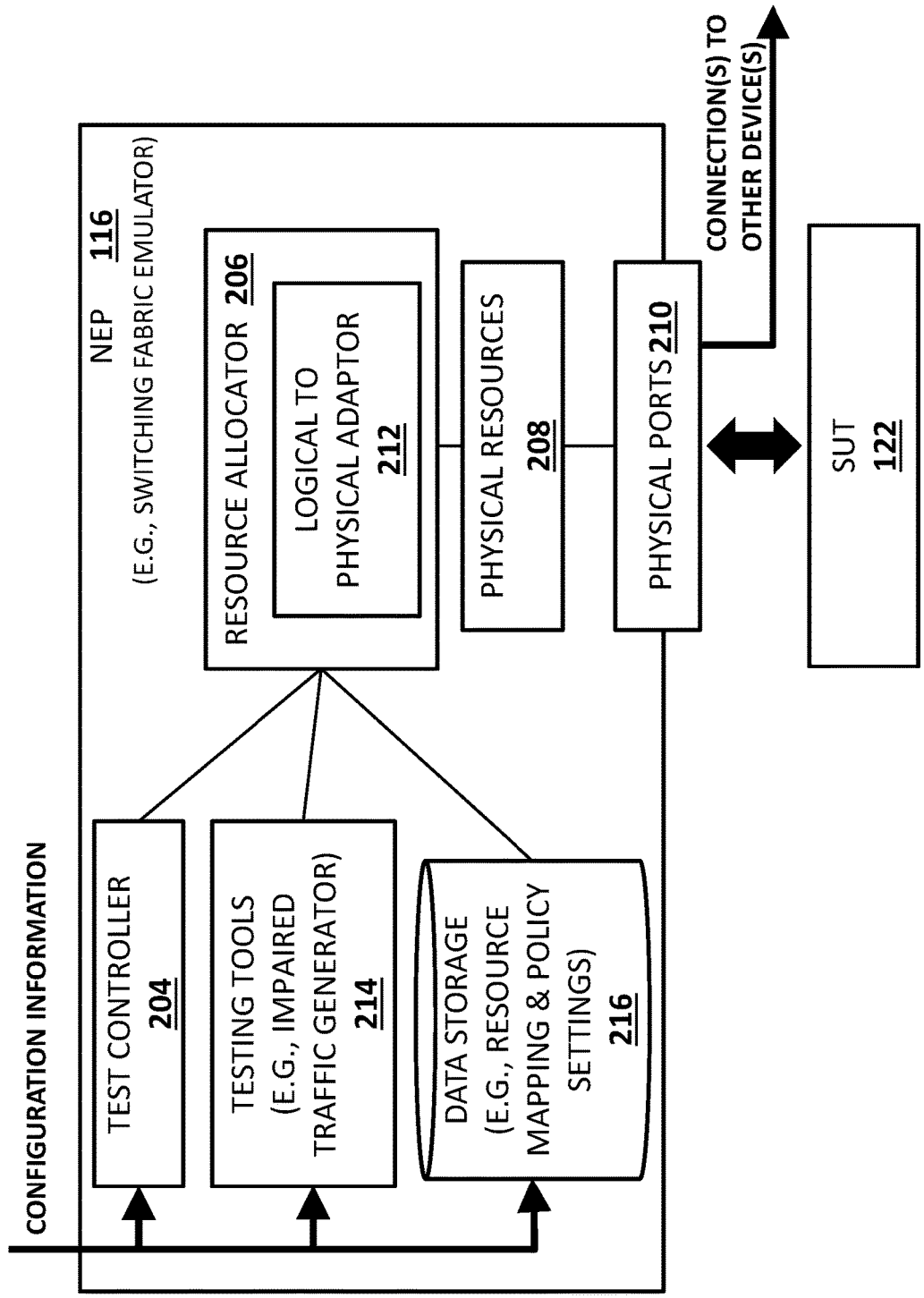
FIG. 2 is a diagram illustrating an example network emulation platform for emulating a switching fabric.

FIG. 2 is a diagram illustrating example aspects of NEP 116. In some embodiments, NEP 116 may include a stand-alone tool, a testing device, a network equipment test device or platform, or software executing on one or more processor(s). In some embodiments, NEP 116 may be a single device or node (e.g., a chassis) and may include one or more modules for emulating a data center or a switching fabric environment and/or may include one or more modules for performing various test related functions associated with the emulated switching fabric environment.

In some embodiments, NEP 116 may be configured to interact with and/or to be configured by CTC 102 or related entities (e.g., CM 108 and/or NEPRA 110). For example, NEP 116, along with other NEPs, may receive particular configuration information from CTC 102 or a related entity via an internal test API. In this example, the configuration information received by NEP 116 may include configuration instructions for configuring NEP 116 or resources therein for use in a testing scenario, e.g., involving one or more test sessions. In another example, the configuration information received by NEP 116 may include test related emulation requirements that are used by NEP 116 or entities therein in generating corresponding or compliant commands or instructions for configuring NEP 116 or resources therein.

NEP 116 may include a test controller (TC) 204, resource allocator (RA) 206, switch(es) 208, ports 210, testing tools 214, and data storage 216. TC 204 may be any suitable entity or entities (e.g., software executing on a processor, an FPGA, and/or an ASIC, or a combination of software, an FPGA, and/or an ASIC) for performing one or more aspects associated with configuring resources in NEP 116 and/or for testing SUT 122. In some embodiments, TC 204 may be implemented using one or more processors and/or memory. For example, TC 204 may utilize one or more processors (e.g., executing software stored in memory) to generate traffic patterns or scenarios for various message streams (e.g., flows or sessions). In another example, TC 204 may also utilize one or more processors to perform or initiate various tests and/or analyses involving test packets and/or related responses from SUT 122. In this example, TC 204 may send instructions to various modules or entities in NEP 116, e.g., testing tools 214 for controlling (e.g., to pause, (re)start, or stop) a test session.

In some embodiments, TC 204 may utilize out-of-band and/or in-band ports and/or interfaces for communicating with entities of NEP 116 or test system 100, e.g., CTC 102. For example, in embodiments where TC 204 is external to RA 206, TC 204 may communicate with RA 206 via a management port or related interface.

In some embodiments, TC 204 may interact with one or more testing tools 214. Testing tools 214 may represent software or hardware for testing SUT 122 and/or for performing various test related functions, e.g., performance monitoring, test traffic generation, and test analysis. In some embodiments, testing tools 214 can include, but are not limited to, visibility modules (e.g., packet analyzers), traffic generators, SDN controller applications, GUI and CLI applications, and/or test traffic generation applications for communicating with SUT 122 and/or emulation related tools.

In some embodiments, NEP 116 or aspects thereof may be controlled or defined using one or more user-definable data models. For example, CTC 102 may provide a GUI for allowing user 124 to configure or modify an impairment model, an RA model, a switching model, a switching fabric topology model, a traffic generator model, a network visibility model, etc. used in a testing scenario or a related emulated switching fabric environment. In this example, CTC 102 may send, to TC 204, high-level or user-definable data models indicating a switching fabric topology comprising one or more emulated switches and/or may indicate particular physical resources to allocate to each emulated switch. Continuing with this example, TC 204 or RA 206 may convert these data models into lower-level data models or related computer readable instructions for implementing an emulated switching fabric environment in accordance with the user-definable data models.

In some embodiments, NEP 116 or aspects thereof may be controlled or defined to implement impairments using a common (e.g., standardized, universal, or generic) impairment data model and/or data format. For example, CTC 102 may provide a GUI for allowing user 124 to provide or modify an impairment definition information based on a generic or common impairment data model for defining one or more impairments in a testing scenario or a related test environment. In this example, CTC 102 may send, e.g., to TC 204, RA 206 or test tools 214, various information (e.g., scripts, instructions, configuration and/or orchestration commands, etc.) for configuring, setting up, and/or implementing one or more impairments, e.g., in an emulated switch or link. In another example, CTC 102 may send, e.g., to NEP 116 or entities thereof, the impairment definition information or derived impairment definition information indicating a switching fabric topology comprising one or more emulated switches and/or may indicate particular physical resources to allocate to each emulated switch. Continuing with this example, NEP 116 or entities thereof may convert the impairment definition information or derived impairment definition information into lower-level data models or related instructions for implementing impairments in accordance with the impairment definition information or derived impairment definition information.

In some embodiments, testing tools 214 may include or utilize settings and/or configuration information from CTC 102 or another source for setting up a data center related testing scenario or a related test session. For example, received settings and/or configuration information may be usable for generating and sending test traffic (e.g., background test traffic) that is different from or similar to traffic sent by SUT 122 during a test session. In another example, received settings and/or configuration information may be usable for instructing visibility infrastructure components for monitoring traffic and/or performance aspects associated with a testing scenario or a related emulated switching fabric environment.

In some embodiments, testing tools 214 may represent VIDs (e.g., a traffic engine or traffic generator) or other software capable of performing, causing, or implementing one or more impairments. For example, using configuration information from CTC 102, a traffic generator may be configured to generate and impair test traffic that is directed to traverse elements of testbed 113, e.g., emulated logical switches or an emulated switching fabric environment provided by NEP 116. In this example, the emulated switching fabric environment may be configured so as to emulate a particular switching fabric or topology. In some embodiments, a traffic generator may include one or more test traffic receivers (e.g., test receive ports) that are configured to receive the test traffic and generate test metric information, which may be accessible to a visibility module of test system 100.

In some embodiments, test traffic may transit the emulated switching fabric environment without being received or transiting SUT 122. For example, user 124 may specify, via CM 108, levels and types of background test traffic that can be generated on some or all of the NEPs associated with a particular testing scenario or session. For example, some or all of this test traffic can be configured to transit the emulated switching fabric environment (but not SUT 122) during the execution of a test session involving SUT 122. In another example, some or all of this test traffic can be configured to transit SUT 122 during execution of a test session.

In some embodiments, testing tools 214 may include or utilize a visibility module and/or a related analyzer. In such embodiments, the visibility module and/or the related analyzer may be configurable by TC 204 for monitoring performance or telemetry information in a particular emulated switching fabric environment or topology. For example, a visibility module may be any suitable entity or entities (e.g., software executing on a processor, an ASIC, an FPGA, or a combination of software, an ASIC, or an FPGA) for maintaining network visibility (e.g., using virtual or physical probes or network taps). In this example, virtual taps or software may be configured to provide switch metrics or other information (e.g., network telemetry, switch and/or link status information, etc.) associated with one or more elements (e.g., emulated switches) of an emulated switching fabric environment. Continuing with this example, the visibility module may generate performance reports or test analysis reports associated with SUT 122, e.g., by utilizing the switch metrics or other information associated with packets that pass through or are generated by SUT 122.

In some embodiments, a visibility module may be configured for obtaining emulated logical switch performance metric information associated with a test session by polling RA 206 or another test system entity. For example, by polling for logical switch performance metric information associated with a test session, user 124 may observe how the operation of SUT 122 impacts the emulated switching fabric environment during a test run or session. Polling logical switch performance metric information associated with a test session may also be used for observing how conditions (e.g., background test traffic levels) in the emulated switching fabric environment impact the DUT/SUT during a test run or session.

In some embodiments, a visibility module may be configured to obtain or generate telemetry or operational performance data associated with the emulated switches during the execution of a test session involving SUT 122. In such embodiments, the visibility module may correlate the telemetry or operational performance data with SUT endpoint operational activities and events (e.g., SUT operational actions as defined in a test session) and may report performance data and/or correlated SUT endpoint information to user 124.

Switch(es) 208 may represent one or more switch processors (e.g., a switching ASIC, a system on a chip (SoC), a programming switching chip, a P4-programmable chip, custom hardware, an FPGA, a software switch, etc.) and may include additional hardware, firmware, and/or software for performing one or more functions associated with network switching. For example, switch(es) 208 may utilize an ASIC pipeline for performing frame or packet forwarding, e.g., sending a packet received from one port out another port of the switch. In some embodiments, various resources (e.g., lookup tables or match-action tables used for forwarding decisions, traffic manager buffer memory, etc.) of switch(es) 208 may be managed and/or allocated to provide emulated switches by RA 206.

Ports 210 may include or utilize any suitable entity or entities (e.g., one or more network interface cards (NICs), pluggable jacks, physical processors, transceiver modules, direct-attach cables (DACs) and/or other hardware) for sending or receiving communications. For example, TC 204 or RA 206 may configure one or more of ports 210 (e.g., physical connections) for receiving and sending various types of test packets or related data units; such as IP messages, Ethernet messages, packet data units (PDUs), datagrams, user datagram protocol (UDP) messages, transmission control protocol (TCP) messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, ports 210 may include user traffic ports and management ports. For example, user traffic ports may be associated with processing, sending, and/or receiving test traffic, non-test traffic, and/or in-band management related communications and management ports may be associated with processing, sending, and/or receiving out-of-band management related communications.

In some embodiments, ports 210 may include multiple port modules or groups of ports for interacting with SUT 122. For example, depending on a test operator's configuration settings or a particular test session setup, RA 206 may allocate a portion of physical resources to each switch that is emulated, where the emulated switches are collectively used to mimic a data center switching fabric. In some embodiments, each emulated switch may be allocated or associated with one or more of ports 210 and the port association may be static or semi-static (e.g., particular ports may be assigned to an emulated switch for a given test session).

RA 206 may be any suitable entity or entities (e.g., software executing on a processor, an FPGA, an ASIC, or a combination of software, an FPGA, and/or an ASIC) for performing one or more aspects associated with allocating resources to emulated switches and/or managing emulated switches. In some embodiments, RA 206 may allocate and manage resources of switch(es) 208 for providing emulated switches without requiring a custom ASIC pipeline. In some embodiments, RA 206 can be external or internal to switch(es) 208.

In some embodiments, RA 206 may utilize one or more management ports or related interfaces for communicating with a controller or related applications (e.g., CTC 102, TC 204 and/or testing tools 214) and/or for communicating with switch(es) 208. For example, TC 204 or a related application may communicate with RA 206 via an out-of-band management port or related interface. In this example, RA 206 may send instructions or other communications to switch(es) 208 via another management port or related interface.

In some embodiments, RA 206 may include a logical to physical adaptor 212. Logical to physical adaptor 212 may be any suitable entity or entities (e.g., software executing on a processor, an FPGA, an ASIC, or a combination of software, an FPGA, and/or an ASIC) for converting and/or translating communications to refer to logical (e.g., virtual) or physical resources depending on the destination. For example, when requesting information about available switching resources via RA 206, testing tools 214 and/or SUT 122 may "see" a set of emulated switches each with a subset of resources instead of switch(es) 208. In this example, logical to physical adaptor 212 may translate information about logical resources into information about physical resources of a single switch (e.g., Tomahawk 3) and vice versa so that interacting nodes may remain unaware of the underlying switch(es) 208 or related switch resources.

In some embodiments, RA 206 and/or logical to physical adaptor 212 may reside between a native device interface and interacting entities (e.g., SUT 122, testing tools 214, or external devices) and may act as a communications proxy or agent using a logical interface. For example, SUT 122 may include a network switch controller that configures switching resources by sending, via a logical interface associated with RA 206, configuration requests for requesting and/or configuring one or more switches. In this example, RA 206 and/or logical to physical adaptor 212 may translate the configuration requests received via the logical interface into one or more corresponding requests for transmission via a native switch interface, where the corresponding requests include commands for configuring appropriate physical resources of underlying switch(es) 208. Further, RA 206 and/or logical to physical adaptor 212 may translate switch performance results coming from a native switch interface into virtualized results (e.g., link status or counter values for a physical port '3' may be changed to values for a logical port 'v1' of an emulated switch 'TORSW1') before sending the virtualized results to the network switch controller via the logical interface.

In some embodiments, RA 206 and/or logical to physical adaptor 212 may create, store, and/or use switching ASIC emulation data (e.g., physical to logical port mapping, physical buffers to virtual buffers mapping and resource allocation, etc.) and related policies (e.g., virtual and real port speed, virtual and real throughput, topologies, forwarding rules, classes of service, etc.) for sharing physical switch resources amongst the emulated switches. For example, by using port mapping data and policies stored in data storage 216, logical ports on an emulated switch TORSW1 may be translated into one or more physical ports. In this example, configuration commands for setting speed of a particular logical port can be translated so that the speed of corresponding physical port is set. Continuing with this example, to query the statistical counters for the logical port, the statistical counters for the corresponding physical port may be queried.

In some embodiments, RA 206 and/or logical to physical adaptor 212 may utilize a modified proprietary (e.g., vendor) API (e.g., a vendor's software development kit (SDK) or by utilizing a wrapper API that interacts with a vendor API. For example, by using a wrapper API, RA 206 can manage a fleet of emulated switches using off-the-shelf or commodity ASICs with commercial or open-source NOSes that utilize a proprietary or vendor API.

In some embodiments, RA 206 and/or logical to physical adaptor 212 may utilize a custom adaptor that handles certain applications or functions which may involve a subset of resource management and mapping requirements than a standard switching API. For example, by using a custom adaptor, RA 206 can manage a fleet of emulated switches for certain use cases using off-the-shelf or commodity ASICs.

In some embodiments, NEP 116 or entities thereof (e.g., TC 204, testing tools 214, and/or RA 206) may include functionality for accessing data storage 216. Data storage 216 may be any suitable entity or entities (e.g., a storage device, a non-transitory computer readable medium, or a storage system) for maintaining or storing information related to switching ASIC emulation, network testing, or related test analysis. For example, data storage 216 may include switching ASIC emulation data (e.g., physical to logical port mapping, physical buffers to virtual buffers mapping, etc.) and related policies (e.g., virtual and real port speed, virtual and real throughput, topologies, forwarding rules, classes of service, etc.) for sharing physical switch resources amongst the emulated switches. Data storage 216 may also include test traffic models, test sessions, test session data, topology information for emulated switching fabric environments, information usable for generating performance metrics (e.g., statistics) associated with one or more aspects of SUT 122, and/or other information associated with testing SUT 122. In some embodiments, data storage 216 may be located at NEP 116, another node, or distributed across multiple platforms or devices.

It will be appreciated that FIG. 2 is for illustrative purposes and that various depicted entities, their locations, and/or their functions described above in relation to FIG. 2 may be changed, altered, added, or removed. For example, NEP 116 may include a chassis or rack including one or more computers (e.g., blade computers) each including at least one processor coupled to a memory, e.g., data storage 216. In this example, each server may include functionality of TC 204, RA 206, and/or testing tools 214.

Figure 3:
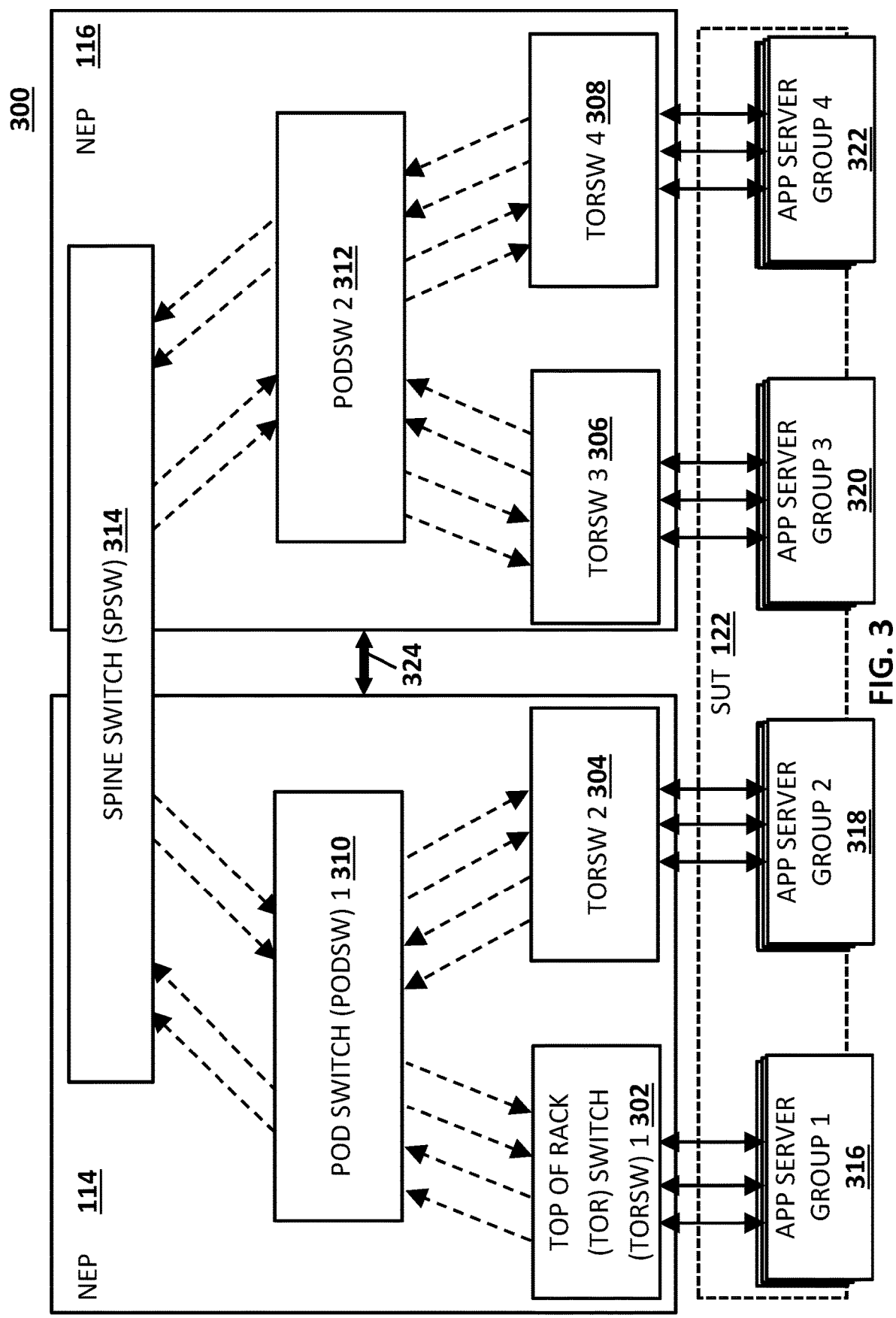
FIG. 3 is a diagram illustrating an example emulated switching fabric usable for network testing.

FIG. 3 is a diagram illustrating an example emulated switching fabric 300 usable for network testing. Emulated switching fabric 300 may represent a switching fabric comprising a network of emulated switches (e.g., traffic forwarding devices) for forwarding packets from or to SUT 122 or other entities, where the emulated switches may be connected via a particular (e.g., user-defined) logical topology. For example, emulated switching fabric 300 may be implemented using resources (e.g., switches 208) of NEPs 114 and 116 and configured based on user input and/or predetermined environment templates or data models, e.g., stored in data storage 216.

In some embodiments, e.g., where emulated switching fabric 300 uses multiple NEPs (e.g., NEPs 114 and 116), physical connections or links may be used for communicatively connecting NEPs or physical resources therein. For example, each of NEPs 114 and 116 may use one or more of its physical ports 210 for interconnecting or linking with other NEPs, e.g., via 40G or 100G links. In another example, each of NEPs 114 and 116 may be communicatively connected via wireless transceivers.

Referring to FIG. 3, emulated switching fabric 300 may represent a 3-stage Clos switching network comprising various stages of emulated switches, wherein each emulated switch is implemented using physical resources of NEP 114 and/or 116. As depicted in FIG. 3, stage one switches of emulated switching fabric 300 include top of rack (TOR) switches (TORSWs) 302 and 304 implemented using NEP 114 and TORSWs 306 and 308 implemented using NEP 116. Stage two switches of emulated switching fabric 300 include cluster or pod switch (PODSW) 310 implemented using NEP 114 and PODSW 312 implemented using NEP 116. Stage three of emulated switching fabric 300 includes a spine switch (SPSW) 314 implemented using both NEP 114 and 116. In some embodiments, TORSWs 302-308 may represent or emulate switches that are connected to multiple servers (e.g., located within a rack or nearby rack), PODSWs 310-312 may each represent or emulate an aggregation switch that is connected to multiple TORSWs, and SPSW 314 may represent or emulate a higher-level aggregation switch that is connected to multiple PODSWs.

In FIG. 3, virtual or logical links between emulated switches (or portions thereof) implemented on a single NEP (e.g., links between PODSW1 310 and TORSW1 302) are shown as unidirectional links and may utilize loopback connections. While not shown in FIG. 3, virtual links between emulated switches implemented on different NEPs may be bidirectional links and may utilize one or more physical cable(s) 324 connected via physical ports of NEPs 114 and 116. Similarly, communications between an emulated switch (e.g., SPSW 314) implemented across NEPs 114 and 116 may traverse physical cable(s) 324 and may be bilateral in nature; however such inter-NEP, intra-emulated switch communications may be transparent to endpoints and/or elements of emulated switching fabric 300.

In some embodiments, characteristics (e.g., bandwidth, capacity, supported protocols, or processing speed or throughput) of emulated switches may be varied as defined by test configuration information or related settings. For example, each of NEPs 114 and 116 may include a different brand, type, and/or version of switches 208 and/or other hardware. In this example, depending on user input and/or configuration information, NEPRA 110 may indicate which NEP is to emulate which emulated switches based on NEP capabilities and user requirements for emulated switching fabric 300.

In some embodiments, some physical ports of switch(es) 208 of NEPs 114 and 116 may be associated with different emulated switches and may utilize loopback interfaces or internal interfaces for emulating communications between some emulated switches, while other emulated switches (e.g., TORSWs 302-308) may utilize physical interfaces and/or physical cabling for communicating with SUT 122 or portions thereof.

In some embodiments, SUT 122 may represent or include a set of application server groups 316-322, each representing one or more servers and/or applications. For example, application server group 1 316 may include multiple servers (e.g., 16 or more servers in a single rack), each having one or more connections to a TOR switch. In some examples, a server of application server groups 316-322 may include multiple applications or perform different services (e.g., machine learning (M/L), storage offload, search engines, webpages, video streaming, email, etc.) for users or may perform similar services for different sets of users. In some examples, a server of application server groups 316-322 may act as a client to another server.

In some embodiments, each of application server groups 316-322 may be connected (e.g., physically cabled) to a distinct set of physical ports 210 of switch(es) 208 in NEP 114 or NEP 116, where each set of physical ports 210 is assigned or allocated to a particular emulated switch. For example, RA 206 of NEP 114 may assign particular physical ports (e.g., '1', '2', and '3') to an emulated switch 'TORSW1' and may virtualize those physical ports as corresponding virtual ports (e.g., '3', '4', and '5', respectively). In this example, applications and/or servers in application server group 1 316 may be communicatively coupled to one or more of the logical ports of the emulated switch 'TORSW1'.

In some embodiments, configuration information may include any suitable information for mapping logical ports associated with emulated switching fabric 300 to physical ports of switch(es) 208 in one of NEPs 114 and 116. In some embodiments, configuration information may be stored or maintained in data storage 216 and may be usable for translating port information or related information in switch configuration commands, performance metrics, and/or other communications.

It will be appreciated that FIG. 3 is for illustrative purposes and that various depicted entities, their locations, and/or their functions described above in relation to FIG. 3 may be changed, altered, added, or removed.

FIG. 4 is a diagram illustrating an example impairment configuration data 400 using a common data model or data format. In some embodiments, data 400 may be stored or provided in XML, JSON, a data interchange format, or another data format.

In some embodiments, data 400 may represent values based on a generic and/or open source data model for representing or defining attributes for one or more network and/or traffic related impairments. In such embodiments, the data model may not be limited to impairments performed by a particular type of ID or IDs from a particular ID manufacturer and, instead, the data model may be capable of defining impairments or characteristics thereof that some IDs are incapable of implementing. For example, an example impairment data model may be capable of representing different types of impairments by providing objects, attributes, characteristics, and/or metadata for representing various aspects of a network and/or traffic related impairment. In this example, an impairment attribute may be represented or indicated by one or more attribute value pairs (AVPs) or value-data pairs.

In some embodiments, data 400 may utilize a common (e.g., standardized, universal, or generic) impairment data model, where the impairment data model uses an impairment data structure (e.g., a data object or a class) for defining various impairments for test sessions. In some embodiments, an impairment object or class may include one or more mandatory attributes (e.g., name, type, link/location, percentage/amount, etc.) and may also include non-mandatory or optional attributes (e.g., traffic type, time, maximum, minimum, etc.). For example, an impairment type may affect or determine the mandatory and/or non-mandatory attributes that are generally defined.

Referring to FIG. 4, data 400 defines or describes a 'drop frames' impairment for dropping frames (e.g., packets) at two different links during the same time interval, e.g., of a test session. For example, as depicted in FIG. 4, a "10 percentage drop" impairment is defined for a link "Link S.1/1" using a "percentage_time" mode set at "10.0" percentage and a "Minimum possible drop" impairment is defined for a link "Link P.2.1/1" using a "min_time" mode at "5.0" percentage.

It will be appreciated that FIG. 4 is for illustrative purposes and that data 400 for defining impairments may include additional and/or different information that depicted in FIG. 4.

Figure 5:
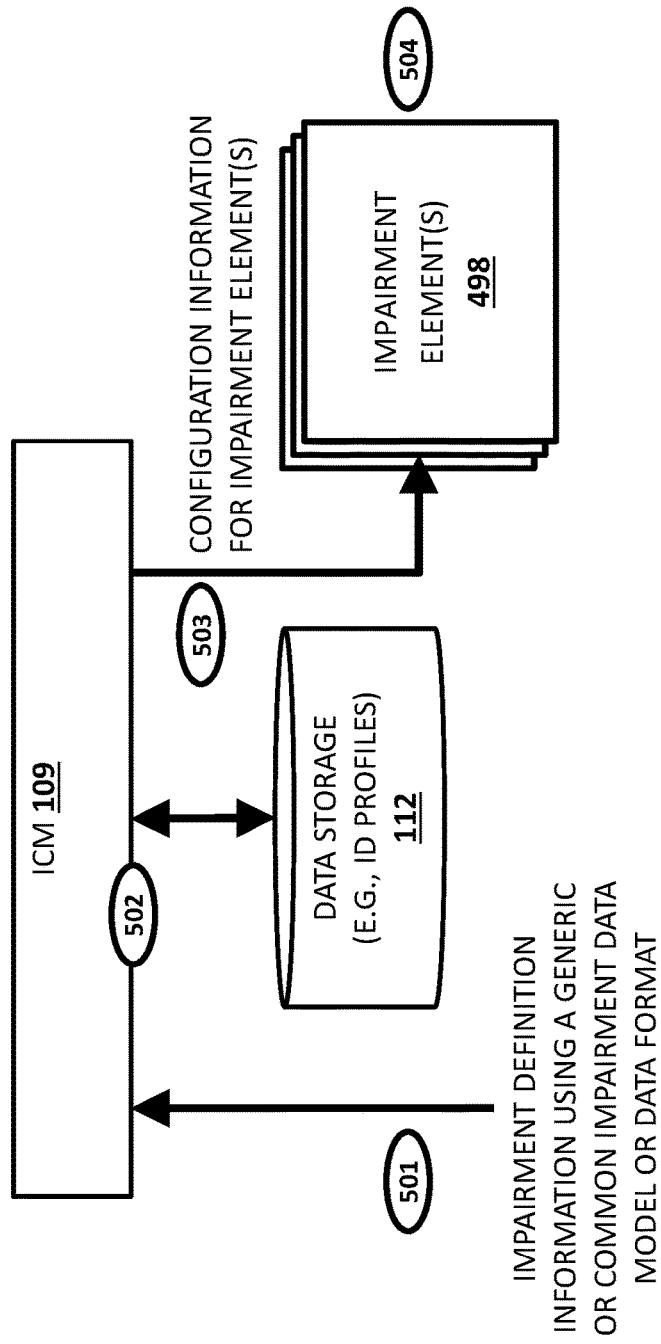
FIG. 5 is a diagram illustrating an example test scenario comprising an impairment configuration manager.

FIG. 5 is a diagram illustrating an example test scenario 500 comprising ICM 109. As stated above, ICM 109 may be any suitable entity or entities (e.g., software executing on a processor, an FPGA, and/or an ASIC, or a combination of software, an FPGA, and/or an ASIC) for performing one or more aspects associated with controlling, generating, or effecting one or more impairments of a testing environment during a test session or test scenario. In some embodiments, ICM 109 or similar functionality may be implemented using a single device or computer platform or distributed across multiple devices or computer platforms.

In some embodiments, scenario 500 may involve test system 100, ICM 109, or another entity (e.g., CTC 102, CM 108, a host computer executing software on one or more processors, etc.) receiving impairment definition information utilizing a generic or common data model or data format (e.g., data 400), using this information to identify and select appropriate impairment element(s) 498 for performing the requested impairments (or similar impairments), and generating device configuration information and/or orchestration information for manually or automatically setting up and configuring impairment element(s) 498.

In some embodiments, impairment elements 498 may represent multiple physical IDs and/or VIDs that are available for use during testing. In such embodiments, at least one of impairment elements 498 may have different capabilities, configuration protocols, and/or configuration procedures than other impairment elements 498. For example, impairment elements 498 may include different types, models, and/or versions of IDs that can be configured or set up to implement or cause impairments, such as ID(s) 118 and/or emulated IDs implemented on or by NEPs 114 and/or 116.

In some embodiments, since a common (e.g., standardized, universal, or generic) impairment data model may be unattuned or unrelated to particular impairment elements or manufacturers, the common impairment data model may be capable of defining impairments that do not translate directly to features or impairments performed by a particular impairment element or to features or impairments that are even performable by a particular impairment element. Further, in some embodiments, the common impairment data model may allow high-level attributes and/or low-level attributes to be defined that may or may not correlate to one or more programmable functions or features of one or more impairment elements. In such embodiments, ICM 109 or another entity may include functionality (e.g., data translation and/or best-fit selection techniques) for approximating requested impairments and orchestrating impairment configurations based on available impairment elements.

Referring to scenario 500, in step 501, test system 100, ICM 109, or another entity (e.g., of test system 100) may receive user input (e.g., test metadata, user preferences regarding testing, etc.) and/or impairment definition information (e.g., impairment attributes or a related specification defining impairments for a test session or environment) in a generic or common data model or data format (e.g., an open-source based impairment data model or related XML data format) indicating or defining one or more impairments to be implemented for a test session and/or environment.

In step 502, test system 100, ICM 109, or another entity may utilize user input, one or more ID profiles (e.g., device attributes, capabilities, metadata, etc.) from a device profile store (e.g., located in storage 112), and/or impairment definition information (e.g., common impairment data model settings or preferences (e.g., data 400) or derived configuration data) to select impairment element(s) 498 for implementing impairments and generating device configuration information and/or orchestration information for setting up and/or configuring the selected impairment element(s) 498 to implement the requested impairments.

In step 503, test system 100, ICM 109, or another entity may export, provide, or send device configuration information and/or orchestration information to impairment element(s) 498 or another entity for manually or automatically setting up and configuring impairment element(s) 498 for testing SUT 122.

In step 504, after impairment element(s) 498 are configured for use in testing SUT 122, test system 100, ICM 109, or another entity may initiate one or more test sessions that utilize impairment element(s) 498 when testing SUT 122.

It will be appreciated that FIG. 5 and steps 501-504 are for illustrative purposes and that different and/or additional actions may be performed when configuring impairment element(s) 498 and, moreover, that steps 501-504 or related actions may be performed by different entities than those depicted in FIG. 5.

Figure 6:
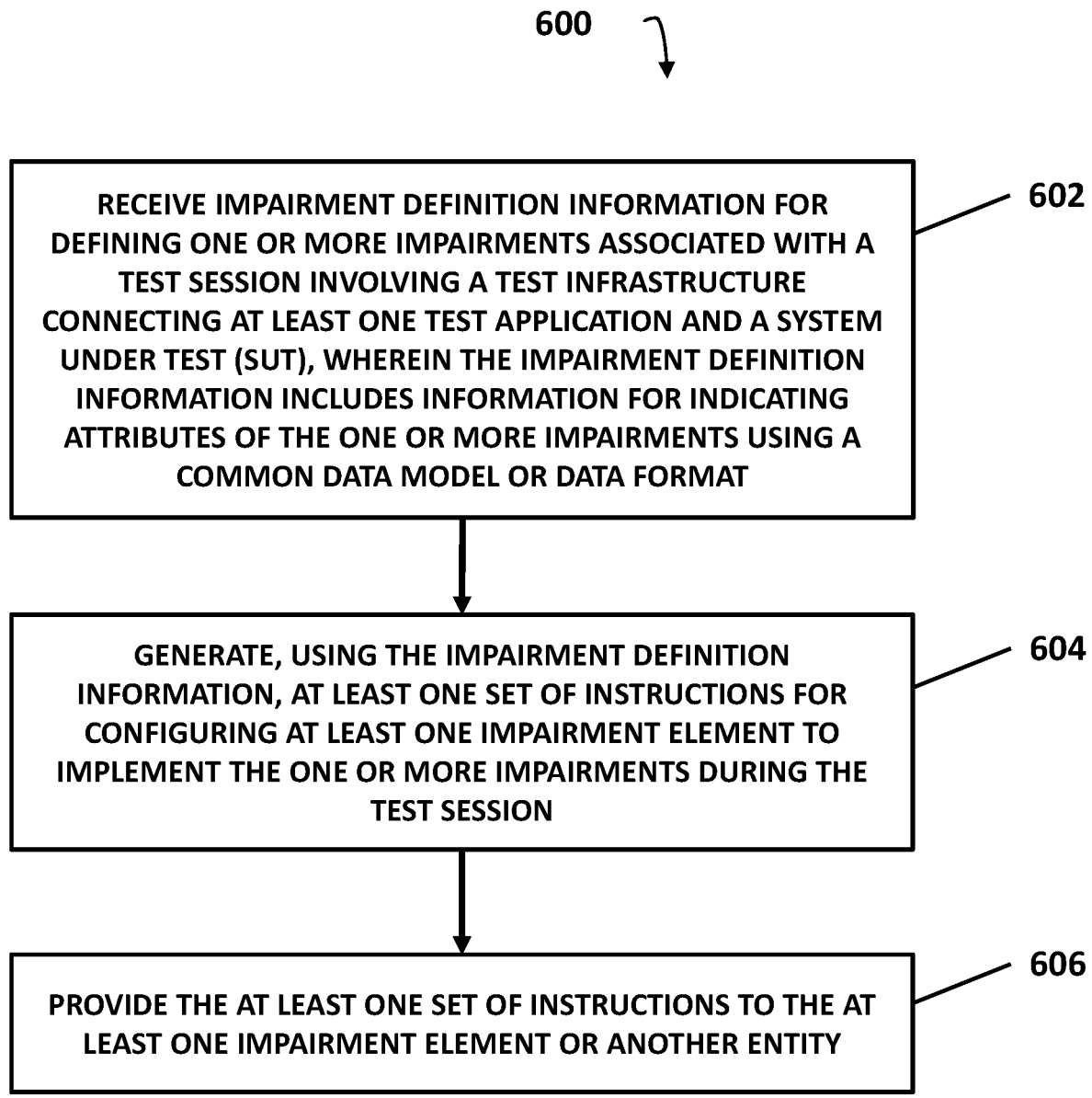
FIG. 6 is a diagram illustrating an example process for using an impairment configuration manager.

FIG. 6 is a diagram illustrating an example process 600 for using an impairment configuration manager. In some embodiments, process 600, or portions thereof, may be performed by or at test system 100, CTC 102, CM 108, ICM 109, and/or another node or module. In some embodiments, process 600 may include steps 602, 604, and 606.

In some embodiments, process 600 may occur at an impairment configuration manager (e.g., ICM 109) of a network test system (e.g., test system 100) implemented using at least one processor. In some embodiments, process 600 may occur before, after, during or concurrently with a test session implemented or facilitated by test system 100, ICM 109, or other entities.

Referring to process 600, in step 602, impairment definition information (e.g., data 400) for defining one or more impairments associated with a test session involving a test infrastructure connecting at least one test application and a system under test (SUT) may be received. In some embodiments, test infrastructure may include a switching fabric emulator (e.g., one or more of NEPs 114-116) comprising at least one switch processor (e.g., switching ASIC or programmable switching chip). In some embodiments, impairment definition information includes information for indicating attributes of the one or more impairments using a common data model or data format.

In step 604, at least one set of instructions (e.g., device configuration and/or orchestration instructions) for configuring at least one impairment element (e.g., ID(s) 118 or impairment element(s) 498) to implement the one or more impairments during the test session may be generated using the impairment definition information.

In step 606, the at least one set of instructions may be provided to the at least one impairment element (e.g., ID(s) 118 or impairment element(s) 498) or another entity (e.g., NEPRA 110 or NEP(s) 114 and/or 116).

In some embodiments, a test controller (e.g., CTC 102, CM 108, or TC 204) of the network test system (e.g., test system 100 executing process 600 or portions thereof) may be configured for: initiating the test session, wherein the test session involves using the at least one impairment element and the at least one test application to test the SUT; and obtaining and reporting test results associated with the test session.

In some embodiments, generating at least one set of instructions (e.g., device configuration and/or orchestration commands) may include using feedback information from one or more test system elements and/or user input associated with one or more predetermined impairment element profiles (e.g., ID profiles). For example, after compiling or translating an impairment definition file or related data (e.g., data 400) indicating requested impairments, ICM 109 may query an ID profile store containing multiple ID profiles associated with impairment element(s) 498. In this example, ICM 109 may select one or more impairment element(s) 498 for implementing the requested impairments based on device availability and/or their capabilities indicated by their respective ID profiles.

In some embodiments, at least one predetermined impairment element profile (e.g., stored in storage 112) may indicate element attributes, element availability, element status, impairment capabilities, or preconfigured or default settings.

In some embodiments, generating at least one set of instructions may include using user input, predetermined impairment element profiles, and impairment definition information to automatically select at least one impairment element.

In some embodiments, user input may indicate various element selection techniques or other user preferences. For example, an element selection technique may include a best fit selection technique (e.g., a technique that selects appropriate impairment element(s) 498 for implementing requested impairments or similar impairments relative to one or more user-provided constraints), a least cost selection technique (e.g., a technique that uses one or more cost metrics to select appropriate impairment element(s) 498 for implementing requested impairments), a multiple factor selection technique (e.g., a technique that weights different factors and using a combined score of the weighted factors to select appropriate impairment element(s) 498 for implementing requested impairments), or a user-defined selection technique (e.g., a technique that selects at most two different impairment element(s) 498 or that only allows non-virtual impairment element(s) 498 for implementing requested impairments).

In some embodiments, impairment element(s) 498 may include a switching fabric emulator, a traffic generator, a network emulator device, a physical ID, a virtual ID, an impairment appliance, an impairment virtual machine, an impairment virtual container, an impairment virtual cluster, a smart switch, an emulated ID, a programmable switch ASIC-based ID, a P4 programmable ID, or a programmable ID.

In some embodiments, impairment element(s) 498 may include a first impairment element and a second impairment element, and where at least one set of instructions may include a first set of instructions for configuring the first impairment element and a second set of instructions for configuring the second impairment element.

In some embodiments, a first impairment element may include a virtual or software-based ID and a first set of instructions for configuring the first impairment element may include an executable file, an executable image, commands, or messages for creating or instantiating the virtual or software-based ID.

In some embodiments, a second impairment element may include a physical or hardware-based ID and a second set of instructions for configuring the second impairment element includes cabling instructions for instructing a user to connect the physical or hardware-based impairment device to one or more elements of the test infrastructure.

In some embodiments, a first impairment element and a second impairment element (e.g., configured by test system 100 or ICM 109 using impairment definition information utilizing a common data model or data format) may have distinct, disparate, or incompatible features, programming capabilities, configuration protocols or procedures, APIs, physical components, and/or data structures from each other.

In some embodiments, one or more impairments may include a frame or packet drop, a frame or packet duplication, packet reordering, a packet burst, a delay increase, a jitter increase, a latency increase, a frame error, a header field scrambling, traffic shaping, bandwidth limiting, a policy based behavior causing impairment, a packet misdirection or misrouting, a link failure, a link flap, or a checksum or validation error.

It will be appreciated that process 600 is for illustrative purposes and that different and/or additional actions may be used. It will also be appreciated that various actions described herein may occur in a different order or sequence.

It should be noted that test system 100, CTC 102, CM 108, ICM 109, and/or functionality described herein may constitute one or more special purpose computing devices. Further, test system 100, CTC 102, CM 108, ICM 109, and/or functionality described herein can improve the technological field of testing networks and related nodes by providing mechanisms, systems, methods, and/or techniques for receiving, via a common data model or data format, information defining one or more impairments and using that information to generate configuration and/or orchestration commands or other information for configuring one or more impairment element(s) 498 to provide the one or more impairments. For example, when configuring a test session to test SUT 122, user 124 may send a generic model based impairment definition file or related data to test system 100 or elements thereof. In this example, ICM 109 or another entity may use the impairment definition file to compile or generate one or more sets of instructions (e.g., an executable file or script, commands, etc.) for configuring one or more impairment element(s) 498 (e.g., virtual and/or physical IDs) for implementing impairments defined by the impairment definition file or related data.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for using an impairment configuration manager, the method comprising:
    at an impairment configuration manager of a network test system implemented using at least one processor:
        receiving impairment definition information for defining one or more impairments associated with a test session involving a test infrastructure connecting at least one test application and a system under test (SUT), wherein the impairment definition information includes information for indicating attributes of the one or more impairments using a common data model or data format;
        generating, using the impairment definition information, at least one set of instructions for configuring at least one impairment element to implement the one or more impairments during the test session; and
        providing the at least one set of instructions to the at least one impairment element or another entity, wherein the at least one impairment element includes a first impairment element and a second impairment element, and wherein the at least one set of instructions includes a first set of instructions for configuring the first impairment element and a second set of instructions for configuring the second impairment element, wherein the second impairment element includes a physical or hardware-based impairment device and the second set of instructions includes cabling instructions for instructing a user to connect the physical or hardware-based impairment device to one or more elements of the test infrastructure; and
    at a test controller of the network test system:
        initiating the test session, wherein the test session involves using the at least one impairment element and the at least one test application to test the SUT; and
        obtaining and reporting test results associated with the test session.

2. The method of claim 1 wherein generating the at least one set of instructions includes using feedback information from one or more test system elements and/or user input associated with one or more predetermined impairment element profiles associated with available impairment elements.

3. The method of claim 2 wherein at least one of the one or more predetermined impairment element profiles indicates element attributes, element availability, element status, impairment capabilities, or preconfigured or default settings.

4. The method of claim 2 wherein generating the at least one set of instructions includes using the user input, the predetermined impairment element profiles, and the impairment definition information to automatically select the at least one impairment element, wherein the user input indicates that impairment elements are selected using a best fit selection technique, a least cost selection technique, a multiple factor selection technique, or a user-defined selection technique.

5. The method of claim 1 wherein the first impairment element includes a virtual or software-based impairment device and the first set of instructions includes an executable file, an executable image, commands, or messages for creating or instantiating the virtual or software-based impairment device.

6. The method of claim 1 wherein the one or more impairments include a frame or packet drop, a frame or packet duplication, packet reordering, a packet burst, a delay increase, a jitter increase, a latency increase, a frame error, a header field scrambling, traffic shaping, bandwidth limiting, a policy based behavior causing impairment, a packet misdirection or misrouting, a link failure, a link flap, or a checksum or validation error.

7. The method of claim 1 wherein the at least one impairment element includes a switching fabric emulator, a traffic generator, a network emulator device, a physical impairment device, a virtual impairment device, an impairment appliance, an impairment virtual machine, an impairment virtual container, an impairment virtual cluster, a smart switch, an emulated impairment device, a programmable switch application-specific integrated circuit (ASIC)-based impairment device, a P4 programmable impairment device, or a programmable impairment device.

8. A system for using an impairment configuration manager, the system comprising:
    at least one processor;
    a memory; and
    an impairment configuration manager of a network test system implemented using the at least one processor and the memory, the impairment configuration manager configured for:
        receiving impairment definition information for defining one or more impairments associated with a test session involving a test infrastructure connecting at least one test application and a system under test (SUT), wherein the impairment definition information includes information for indicating attributes of the one or more impairments using a common data model or data format;
        generating, using the impairment definition information, at least one set of instructions for configuring at least one impairment element to implement the one or more impairments during the test session; and
        providing the at least one set of instructions to the at least one impairment element or another entity, wherein the at least one impairment element includes a first impairment element and a second impairment element, and wherein the at least one set of instructions includes a first set of instructions for configuring the first impairment element and a second set of instructions for configuring the second impairment element, wherein the second impairment element includes a physical or hardware-based impairment device and the second set of instructions includes cabling instructions for instructing a user to connect the physical or hardware-based impairment device to one or more elements of the test infrastructure; and a test controller of the network test system configured for:
  initiating the test session, wherein the test session involves using the at least one impairment element and the at least one test application to test the SUT; and
  obtaining and reporting test results associated with the test session.

9. The system of claim 8 wherein generating the at least one set of instructions includes using feedback information from one or more test system elements and/or user input associated with one or more predetermined impairment element profiles associated with available impairment elements.

10. The system of claim 9 wherein at least one of the one or more predetermined impairment element profiles indicates element attributes, element availability, element status, impairment capabilities, or preconfigured or default settings.

11. The system of claim 9 wherein the impairment configuration manager is configured for using the user input, the predetermined impairment element profiles, and the impairment definition information to automatically select the at least one impairment element, wherein the user input indicates that impairment elements are selected using a best fit selection technique, a least cost selection technique, a multiple factor selection technique, or a user-defined selection technique.

12. The system of claim 8 wherein the first impairment element includes a virtual or software-based impairment device and the first set of instructions includes an executable file, an executable image, commands, or messages for creating or instantiating the virtual or software-based impairment device.

13. The system of claim 8 wherein the one or more impairments include a frame or packet drop, a frame or packet duplication, packet reordering, a packet burst, a delay increase, a jitter increase, a latency increase, a frame error, a header field scrambling, traffic shaping, bandwidth limiting, a policy based behavior causing impairment, a packet misdirection or misrouting, a link failure, a link flap, or a checksum or validation error.

14. The system of claim 8 wherein the at least one impairment element includes a switching fabric emulator, a traffic generator, a network emulator device, a physical impairment device, a virtual impairment device, an impairment appliance, an impairment virtual machine, an impairment virtual container, an impairment virtual cluster, a smart switch, an emulated impairment device, a programmable switch application-specific integrated circuit (ASIC)-based impairment device, a P4 programmable impairment device, or a programmable impairment device.

15. A non-transitory computer readable medium having stored thereon executable instructions embodied in the non-transitory computer readable medium that when executed by at least one processor of a computing device cause the computing device to perform steps comprising:
  at an impairment configuration manager of a network test system implemented using at least one processor:
    receiving impairment definition information for defining one or more impairments associated with a test session involving a test infrastructure connecting at least one test application and a system under test (SUT), wherein the impairment definition information includes information for indicating attributes of the one or more impairments using a common data model or data format;
    generating, using the impairment definition information, at least one set of instructions for configuring at least one impairment element to implement the one or more impairments during the test session; and
    providing the at least one set of instructions to the at least one impairment element or another entity, wherein the at least one impairment element includes a first impairment element and a second impairment element, and wherein the at least one set of instructions includes a first set of instructions for configuring the first impairment element and a second set of instructions for configuring the second impairment element, wherein the second impairment element includes a physical or hardware-based impairment device and the second set of instructions includes cabling instructions for instructing a user to connect the physical or hardware-based impairment device to one or more elements of the test infrastructure; and
  at a test controller of the network test system:
    initiating the test session, wherein the test session involves using the at least one impairment element and the at least one test application to test the SUT; and
    obtaining and reporting test results associated with the test session.

\* \* \* \* \*